(12) United States Patent
Hirata et al.

(10) Patent No.: US 8,300,359 B2
(45) Date of Patent: Oct. 30, 2012

(54) PERPENDICULAR MAGNETIC RECORDING HEAD AND MAGNETIC RECORDING DEVICE

(75) Inventors: Kei Hirata, Tokyo (JP); Katsuki Kurihara, Tokyo (JP); Kenkichi Anagawa, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 364 days.

(21) Appl. No.: 12/654,708

(22) Filed: Dec. 30, 2009

(65) Prior Publication Data

US 2011/0157746 A1 Jun. 30, 2011

(51) Int. Cl.
*G11B 5/31* (2006.01)
(52) U.S. Cl. .............. 360/125.3; 360/122; 360/319
(58) Field of Classification Search ........... 360/125.02–125.32, 319, 122
See application file for complete search history.

(56) References Cited

U.S. PATENT DOCUMENTS

| 7,684,149 B2 * | 3/2010 | Mochizuki et al. ....... 360/125.3 |
| 7,872,835 B2 * | 1/2011 | Guan ....................... 360/319 |
| 7,969,684 B2 * | 6/2011 | Le et al. .................. 360/125.3 |
| 2003/0231426 A1 | 12/2003 | Sato |
| 2004/0212923 A1 | 10/2004 | Taguchi |
| 2005/0237665 A1 | 10/2005 | Guan et al. |
| 2007/0146929 A1 | 6/2007 | Maruyama et al. |
| 2007/0177301 A1 | 8/2007 | Han et al. |
| 2007/0230046 A1 * | 10/2007 | Le et al. ................... 360/126 |
| 2007/0236831 A1 * | 10/2007 | Che et al. ................. 360/126 |
| 2008/0112081 A1 | 5/2008 | Matono |
| 2008/0198507 A1 | 8/2008 | Maruyama et al. |
| 2008/0273276 A1 * | 11/2008 | Guan ....................... 360/319 |
| 2008/0278862 A1 | 11/2008 | Kameda et al. |
| 2009/0002885 A1 * | 1/2009 | Sin ........................ 360/125.02 |
| 2009/0147410 A1 * | 6/2009 | Jiang et al. ............... 360/319 |
| 2009/0168240 A1 * | 7/2009 | Hsiao et al. .............. 360/125.02 |
| 2009/0168241 A1 | 7/2009 | Mochizuki et al. |
| 2009/0168242 A1 * | 7/2009 | Liu ........................ 360/125.12 |
| 2011/0205671 A1 * | 8/2011 | Benakli et al. ............ 360/319 |

FOREIGN PATENT DOCUMENTS

JP 2008077723 A * 4/2008
JP 2008262682 A * 10/2008

* cited by examiner

*Primary Examiner* — Will J Klimowicz
(74) *Attorney, Agent, or Firm* — Oliff & Berridge, PLC

(57) ABSTRACT

A perpendicular magnetic write head includes: a magnetic pole; a pair of side shields on both sides, in a write-track width direction, of the magnetic pole with respective side gaps in between; a trailing shield on a trailing side of the magnetic pole and the pair of side shields with a trailing gap in between. Each of the magnetic pole, the side shield, the trailing shield, the side gap, and the trailing gap has an end face exposed on an air bearing surface. The trailing gap has a first regional part and a second regional part. The first regional part separates a trailing edge of the magnetic pole from the trailing shield, and the second regional part separates the pair of side shields from the trailing shield. All or a part of the second regional part has a thickness larger than a thickness of the first regional part.

14 Claims, 22 Drawing Sheets

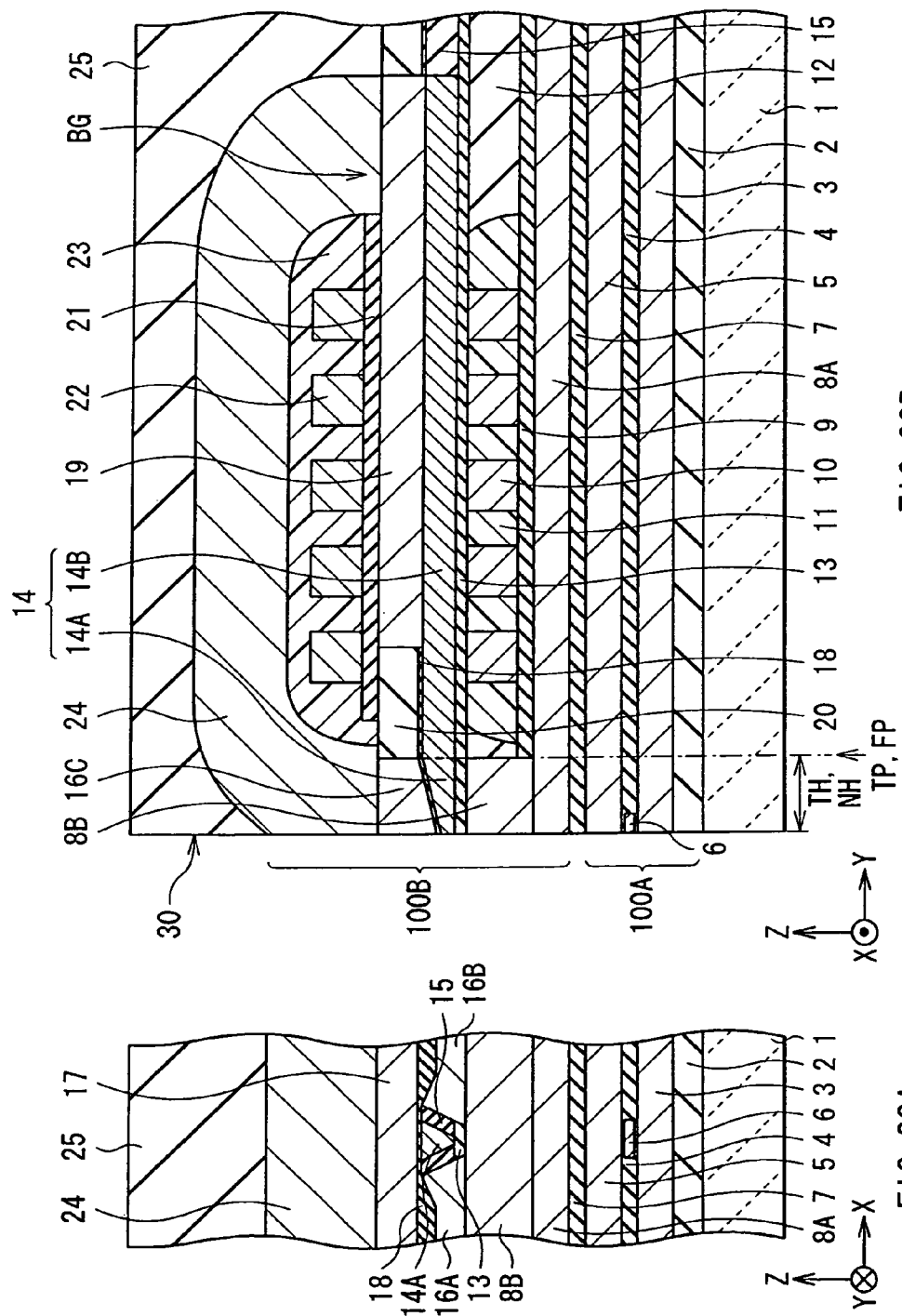

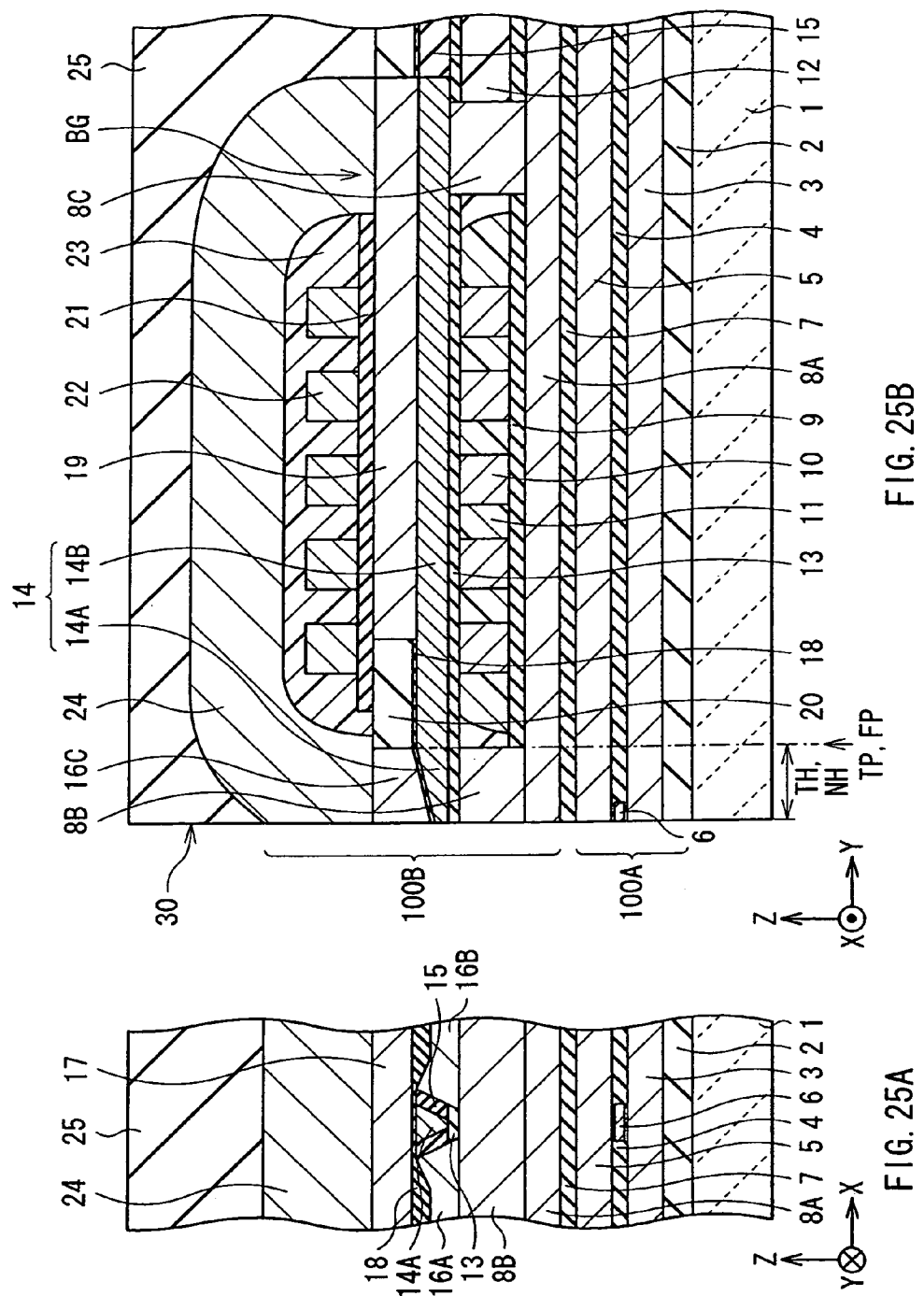

PERPENDICULAR MAGNETIC RECORDING HEAD AND MAGNETIC RECORDING DEVICE

BACKGROUND OF THE INVENTION

1. Field of the Invention

The present invention relates to a perpendicular magnetic recording (i.e. write) head provided with a magnetic pole and a side shield, and a magnetic recording device mounted with the same.

2. Description of the Related Art

In recent years, with an improvement in an areal recording density of a magnetic recording medium (hereinafter, referred to as "recording medium") typified by a hard disk, desired is a performance improvement in a magnetic recording head. In response to such a trend, as a recording method of the magnetic head, in substitution for a longitudinal magnetic recording method in which the direction of a signal magnetic field is set to the in-plane direction of the recording medium, attention is attracted to a perpendicular magnetic recording method in which the direction of the signal magnetic field is set to the direction intersecting a plane of the recording medium. The reason why is that there are such advantages that a linear recording density improves, and a recording medium on which information has been already recorded is less susceptible to thermal fluctuation.

A magnetic recording head of the perpendicular magnetic recording method (hereinafter, referred to as "perpendicular magnetic recording head") is provided with a thin-film coil for generating magnetic flux and a main magnetic-pole layer which leads the magnetic flux generated in the thin-film coil to a recording medium. This main magnetic-pole layer includes a tip portion (magnetic pole) having a fine width, the tip portion generating a magnetic field for recording (recording magnetic field).

In order to handle a high recording density while suppressing a spread of the perpendicular magnetic field, regarding a configuration of the perpendicular magnetic recording head, it is considered to provide a side shield on both sides of a magnetic pole with a gap in between in a write-track width direction (for example, see Japanese Unexamined Patent Publication Nos. 2004-326990, 2004-022004, and 2005-310363).

Under such circumstances, the areal recording density of a recording medium recently tends to increase more and more, so that it is highly desired to more optimize the configuration of the perpendicular magnetic recording head. However, the conventional perpendicular magnetic recording head, provided with the side shield, has a trade-off relationship between ensuring the magnitude of the perpendicular magnetic field and suppressing the spread of the perpendicular magnetic field, and it is difficult to realize both ensuring the magnitude of the perpendicular magnetic field and suppressing the spread of the perpendicular magnetic field, so that there is still room for improvement in recording performance.

These lead to a strong desire for realizing both ensuring the magnitude in the recording magnetic field and suppressing the spread of the recording magnetic field, thereby improving the recording performance.

SUMMARY OF THE INVENTION

A perpendicular magnetic write head according to an embodiment of the present invention includes: a magnetic pole having an end face exposed on an air bearing surface; a pair of side shields each having an end face exposed on the air bearing surface, the pair of side shields being arranged on both sides of the magnetic pole with side gaps in between, respectively, the both sides being in a write-track width direction; and a trailing shield provided on a trailing side of the magnetic pole and of the pair of side shields with a trailing gap in between, and having an end face exposed on the air bearing surface. Here, the trailing gap has a first regional part and a second regional part, the first regional part separating a trailing edge of the magnetic pole from the trailing shield, and the second regional part separating the pair of side shields from the trailing shield, and an overall or a part of the second regional part has a thickness larger than a thickness of the first regional part.

A magnetic recording device according to an embodiment of the present invention includes a recording medium and the perpendicular magnetic write head described above.

In the perpendicular magnetic write head and the magnetic recording device, each according to the embodiment of the present invention, the magnetic pole, the pair of side shields, and the trailing shield are mutually separated by the side gap or the trailing gap. Moreover, the overall or a part of the second regional part, which separates the pair of side shields from the trailing shield, has the thickness larger than the thickness of the first regional part, which separates the trailing edge of the magnetic pole from the trailing shield. These make it easier for a spread component of magnetic flux to be absorbed in a portion in the vicinity of the trailing edge in the side shield, and make it less likely for the magnetic flux to be excessively absorbed in a portion except for the portion in the vicinity of the trailing edge in the side shield. As a result, realized are both ensuring a magnitude of a recording magnetic field and suppressing a spread of the recording magnetic field, so that it is possible to improve recording performance.

BRIEF DESCRIPTION OF THE DRAWINGS

FIG. 23 is a cross-sectional view for explaining a first modification with respect to the configuration of the thin-film magnetic head.

FIG. 25 is a cross-sectional view for explaining a third modification with respect to the configuration of the thin-film magnetic head.

DETAILED DESCRIPTION OF THE PREFERRED EMBODIMENTS

An embodiment of the present invention will be described in detail with reference to the accompanying drawings.
[Configuration of Thin-Film Magnetic Head Including Perpendicular Magnetic Recording Head]

Figure 1:
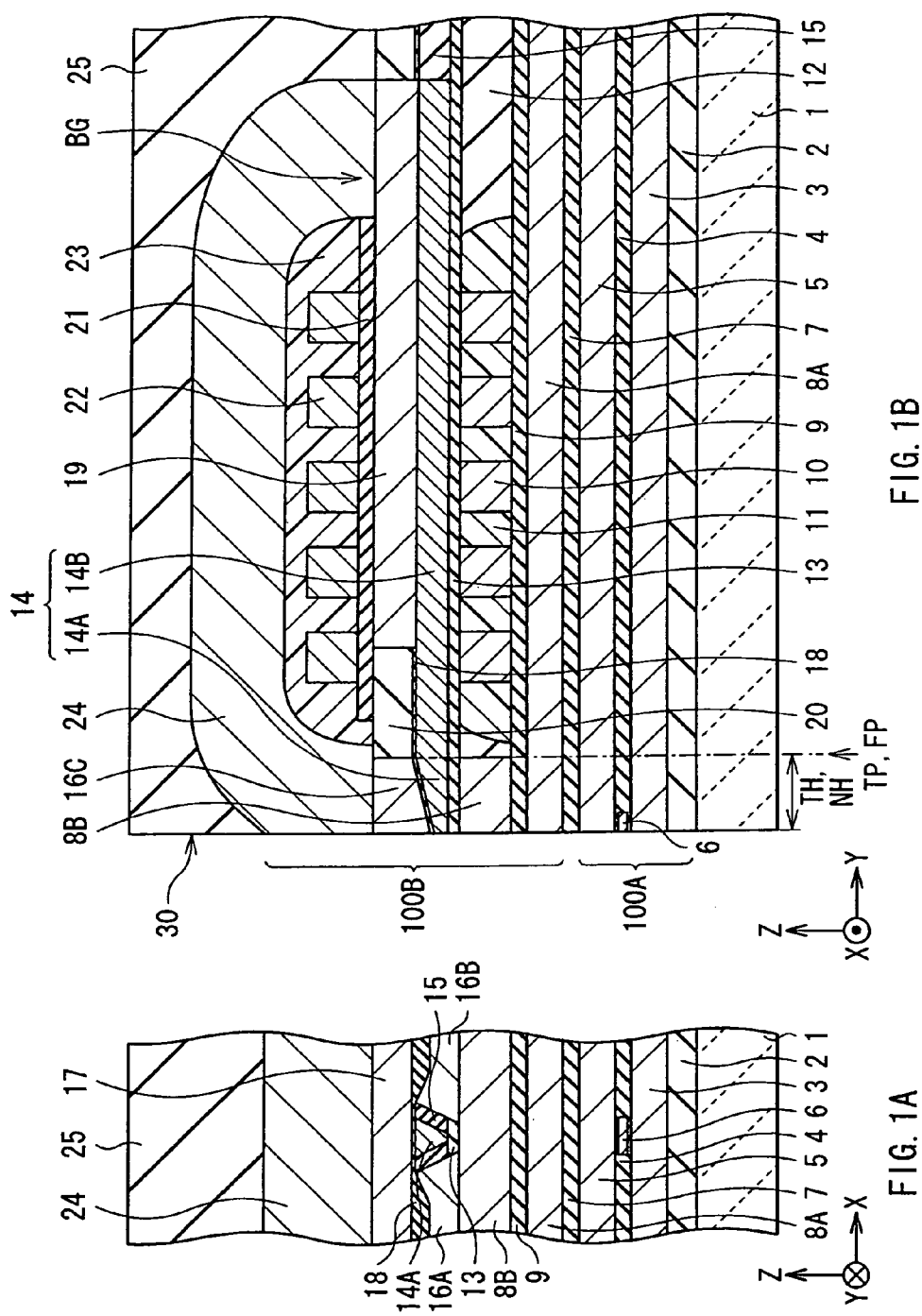
FIG. 1 is a cross-sectional view illustrating the configuration of a thin-film magnetic head provided with a perpendicular magnetic recording head according to an embodiment of the present invention.
Figure 2:
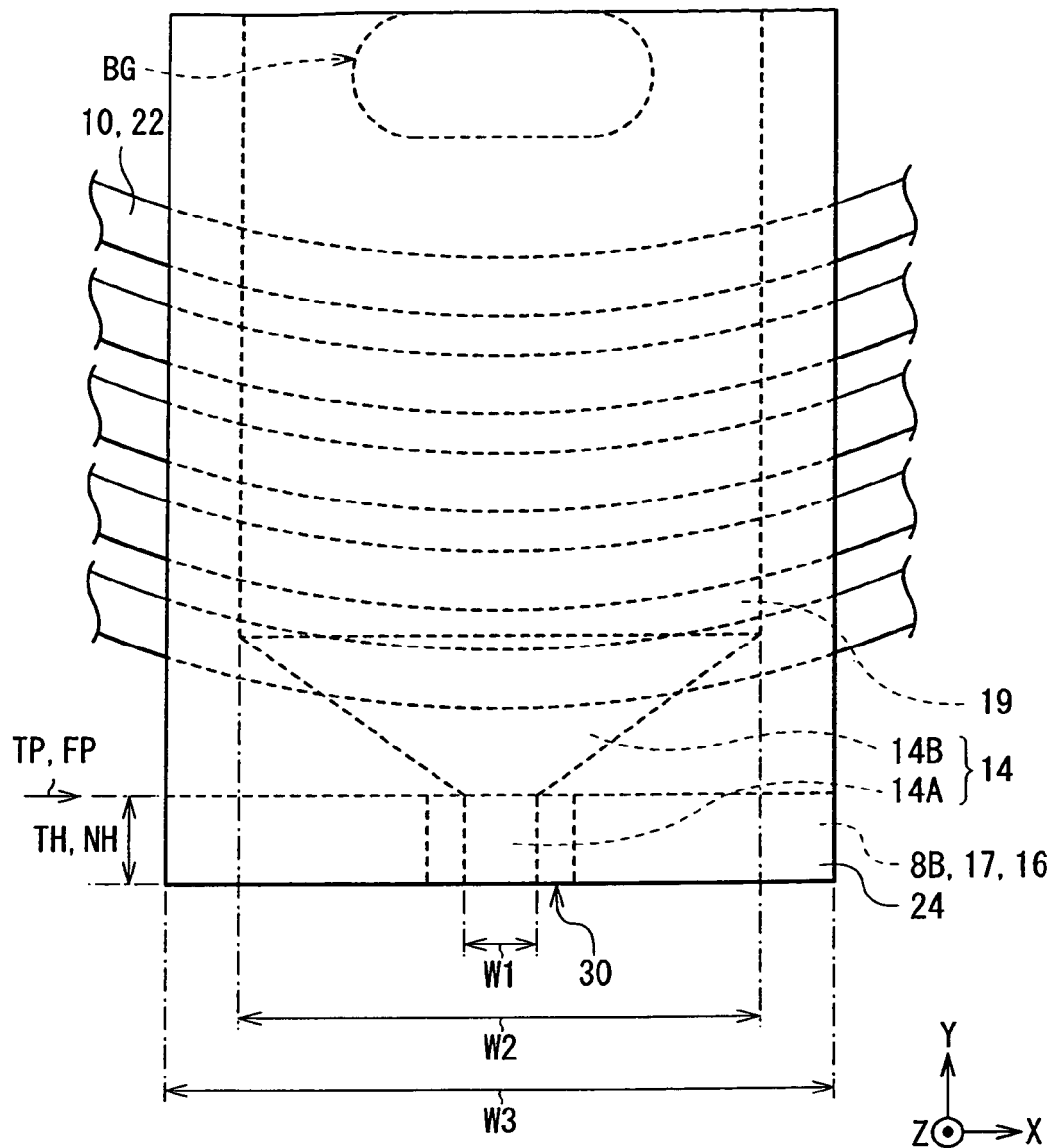
FIG. 2 is a plan view illustrating the configuration of a main part of the thin-film magnetic head illustrated in FIG. 1.
Figure 3:
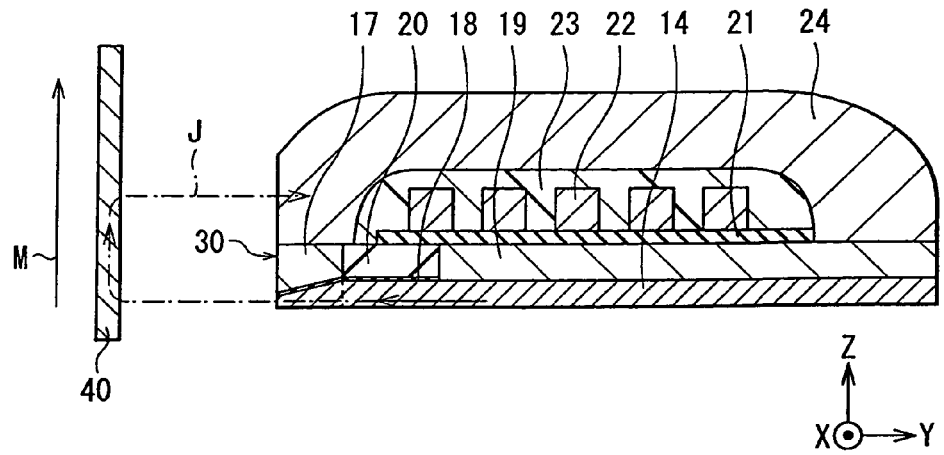
FIG. 3 is a cross-sectional view for explaining a relationship between the thin-film magnetic head illustrated in FIG. 1 and a recording medium.

FIGS. 1 to 3 illustrate the configuration of a thin-film magnetic head including a perpendicular magnetic recording head. Specifically, FIG. 1 indicates the overall cross-sectional configuration; FIG. 2 indicates the planar configuration of a main part; and FIG. 3 explains a relationship between the thin-film magnetic head and a recording medium 40. FIG. 1(A) indicates a cross-section parallel to an air bearing surface 30, and FIG. 1(B) indicates a cross-section perpendicular to the air bearing surface 30, respectively. Upward arrow M illustrated in FIG. 3 indicates the direction where the recording medium 40 moves relatively to the thin-film magnetic head.

In the description below, the dimensions in the X-axis direction, the Y-axis direction, and the Z-axis direction, all of which being indicated in FIGS. 1 to 3, are referred to as "width", "length", and "thickness", respectively. The side close to the air bearing surface 30 is referred to as "front", whereas the side away from the surface 30 is referred to as "rear". Further, the forward side in the direction of arrow M is referred to as "trailing side", whereas the rearward side in the direction of arrow M is referred to as "leading side". These definitions are also similar in FIG. 4 and the figures subsequent to FIG. 4, all of which will be described later.

The thin-film magnetic head described here performs magnetic processing to the recording medium 40 such as a hard disk, and is, for example, a composite head capable of performing both reproducing processing and recording processing.

As indicated in FIG. 1, the thin-film magnetic head has, for example, the configuration in which an insulating layer 2, a reproducing head portion 100A, a separating layer 7, a recording head portion 100B, and an overcoat layer 25 are stacked in this order on a substrate 1, and has the air bearing surface 30 which is one side face common thereto.

The substrate 1 is made of, for example, a ceramic material such as altic ($Al_2O_3$.TiC). The insulating layer 2, the separating layer 7, and the overcoat layer 25 are made of, for example, a nonmagnetic insulating material such as aluminum oxide. The aluminum oxide includes, for example, alumina ($Al_2O_3$).

The reproducing head portion 100A performs the reproducing processing by utilizing a magnetoresistive effect (MR: magneto-resistive effect). The reproducing head portion 100A has, for example, the configuration in which a bottom lead shield 3, a shielding gap 4, and a top lead shield 5 are stacked in this order. In the shielding gap 4, a reproducing element (MR element 6) is buried such that one end face of the reproducing element 6 is exposed on the air bearing surface 30.

The bottom lead shield 3 and the top lead shield 5 magnetically separate the MR element 6 from the periphery of MR element 6, and extend rearward from the air bearing surface 30. The bottom lead shield 3 is made of, for example, a magnetic material such as an alloy of nickel and iron (NiFe). The alloy of nickel and iron includes, for example, permalloy (trade name) in which the content of nickel and that of iron are 80 weight % and 20 weight %, respectively. The top lead shield 5 is made of, for example, a magnetic material such as permalloy. The bottom lead shield 3 and the top lead shield 5 may have a single-layer structure, or may have a multi-layer structure configured, for example, such that a pair of magnetic layers (each being made of a magnetic material such as permalloy) are stacked with a nonmagnetic layer (made of, for example, a nonmagnetic conductive material such as ruthenium (Ru) or a nonmagnetic insulating material such as alumina) in between.

The shielding gap 4 electrically separates the MR element 6 from the periphery thereof, and is made of, for example, a nonmagnetic insulating material such as alumina. The MR element 6 utilizes a giant magnetoresistive effect (GMR: giant magneto-resistive effect), a tunneling magnetoresistive effect (TMR: tunneling magneto-resistive effect), or the like.

The recording head portion 100B is a perpendicular magnetic recording head which performs the recording processing of the perpendicular magnetic recording method. The recording head portion 100B has, for example, the configuration in which there are stacked, on the separating layer 7, a magnetic layer 8A, an insulating layer 9, a thin-film coil 10 buried with insulating layers 11 to 13, a leading shield 8B having an end face exposed on the air bearing surface 30, a main magnetic-pole layer 14, a side gap 15, a pair of side shields 16A, 16B, a trailing shield 17, a trailing gap 18, an auxiliary magnetic-pole layer 19, an insulating layer 20, a thin-film coil 22 buried with insulating layers 21, 23, and a return yoke layer 24, in this order.

The magnetic layer 8A serves as a return path on the leading side, and is made of, for example, a magnetic material such as NiFe or CoNiFe. The magnetic layer 8A disperses, to the leading side, a part of a recording magnetic field released from the main magnetic-pole layer 14, thereby attempting to decrease a WATE (Wide Adjacent Track Erase) effective magnetic field. The WATE effective magnetic field means an effective magnetic field which exercises an effect on a wide-range adjacent track (e.g., a track adjacent by 2 to 10 lanes on the basis of a track to be written).

The thin-film coil 10 mainly generates magnetic flux for suppressing leakage in order to suppress that magnetic flux for recording, generated in the thin-film coil 22, unintentionally reaches (leaks to) the reproducing head portion 100A. The thin-film coil 10 is made of, for example, a highly conductive material such as copper (Cu), and has a winding structure (spiral structure) in which the thin-film coil 10 winds about a back gap BG, as indicated in FIGS. 1 and 2. The number of windings (the number of turns) of the thin-film coil 10 is not specifically limited. However, it is preferred that the number of windings be coincident with the number of turns of the thin-film coil 22.

The insulating layers 11 to 13 electrically separate the thin-film coil 10 from the periphery thereof. The insulating layer 11 is made of, for example, a nonmagnetic insulating material such as photoresist or spin on glass (SOG: Spin On Glass). The insulating layers 12, 13 are made of, for example, a nonmagnetic insulating material such as alumina.

The main magnetic-pole layer 14 accommodates the magnetic flux generated in the thin-film coil 22, and generates a recording magnetic field by releasing the aforementioned magnetic flux from the air bearing surface 30. The main magnetic-pole layer 14 extends rearward from the air bearing surface 30, and is made of, for example, a high-saturation magnetic flux density magnetic material such as an iron-based alloy. The iron-based alloy includes, for example, an alloy of iron and cobalt (FeCo), or an alloy of iron, cobalt, and nickel (FeCoNi).

The main magnetic-pole layer 14 has, for example, generally a battledore-like planar shape, as illustrated in FIG. 2. In this case, the main magnetic-pole layer 14 includes a tip portion 14A having a uniform width W1 which defines a write-track width, and a rear end portion 14B having a width larger than the width W1 in this order from the air bearing surface 30. The tip portion 14A is a portion (magnetic pole) which substantially generates the recording magnetic field. The width of the rear end portion 14B gradually increases, for example, from the width W1 to the width W2 in the front, and is uniform (width W2) in the rear. A position where the width of the main magnetic-pole layer 14 begins to increase is a so-called flare point FP. The main magnetic-pole layer 14 is surrounded with the insulating layer 9, the side gap (SG) 15, and the trailing gap 18, and is separated from the leading shield 8B, the side shields 16A, 16B, and the trailing shield 17 with each other.

The side gap 15 magnetically separates the main magnetic-pole layer 14 from the pair of side shields 16A, 16B in the width direction (write-track width direction=X-axis direction) (refer to FIG. 4 which will be described later). The side gap 15 is provided between the main magnetic-pole layer 14 and the pair of side shields 16A, 16B, and is adjacent to both sides in the width direction, of the main magnetic-pole layer 14 (hereinafter, simply referred to as "both sides"). The thickness of the side gap 15 (gap length of the side gap) is, for example, 0.04 µm to 0.15 µm.

The trailing gap 18 magnetically separates the main magnetic-pole layer 14 from the trailing shield 17 in the thickness direction (direction which intersects the write-track width direction=Y-axis direction), and is also called as a write gap. The trailing gap 18 is provided between the main magnetic-pole layer 14, the pair of side shields 16A, 16B, and the trailing shield 17, and has a central portion 18C (which will be appeared later) that separates a trailing edge TE from the trailing shield 17, as well as wing portions 18A, 18B (both of which will be appeared later) that separate the pair of side shields 16A, 16B from the trailing shield 17. The side gap 15 and the trailing gap 18 are made of, for example, a nonmagnetic material such alumina.

The leading shield 8B, the trailing shield 17, and the side shields 16A, 16B mainly absorb the magnetic flux in the vicinity of the air bearing surface 30, and avoids a spread of the magnetic flux. This increases the gradient of the recording magnetic field, and reduces the write-track width, resulting in the containing of a magnetic field component in the oblique direction in the recording magnetic field. The leading shield 8B, the trailing shield 17, and the side shields 16A, 16B extend rearward from the air bearing surface 30, and ends at, for example, the flare point FP. This makes the trailing shield 17 and the side shields 16A, 16B be adjacent to the insulating layer 20 in the rear and assume the role to define the forefront end position (throat height zero position TP) of the insulating layer 20. The leading shield 8B, the trailing shield 17, and the side shields 16A, 16B are made of, for example, a magnetic material similar to that of the main magnetic-pole layer 14, and has a rectangular planar shape with a uniform width W3 larger than the width W2 as indicated in FIG. 2. The detailed configuration in the vicinity of the main magnetic-pole layer 14 on the air bearing surface 30 will be described later (refer to FIG. 4).

The auxiliary magnetic layer 19 serves as an auxiliary accommodation section for supplying the magnetic flux to the main magnetic-pole layer 14, and may be made of, for example, a magnetic material similar to that of the main magnetic-pole layer 14, or a magnetic material different from that thereof. The auxiliary magnetic-pole layer 19 extends rearward from a position recessed from the air bearing surface 30, on the trailing side of the main magnetic-pole layer 14, and is coupled to the main magnetic-pole layer 14. The auxiliary magnetic-pole layer 19 has, for example, a rectangular planar shape with the width W2, as indicated in FIG. 2.

The insulating layer 20 defines a throat height TH being one of important factors which determine recording characteristics of the thin-film magnetic head, and is provided among the auxiliary magnetic-pole layer 19, the trailing shield 17, and the side shields 16A, 16B. The forefront end position of the insulating layer 20 is the throat height zero position TP as described above. The distance between the throat height zero position TP and the air bearing surface 30 is the throat height TH. The insulating layer 20 is made of, for example, a nonmagnetic insulating material such as alumina. FIGS. 1 and 2 indicate the case where the throat height zero position TP is coincident with the flare point FP.

The thin-film coil 22 generates the magnetic flux for recording. In the thin-film coil 22, for example, a current flows in the direction opposite from the current direction of the thin-film coil 10. The detailed configuration of the thin-film coil 22 is, for example, similar to that of the thin-film coil 10. A helical coil having a structure in which the helical coil winds around the main magnetic-pole layer 14 and the auxiliary magnetic-pole layer 19 while proceeding in the Y-axis direction may be adopted in place of the thin-film coils 10, 22 both having the spiral structure in which the thin-film coils 20, 22 wind in a lamination plane as described above.

The insulating layers 21, 23 electrically separate the thin-film coil 22 from the periphery thereof, and are coupled to the insulating layer 20. The insulating layer 21 is made of, for example, a nonmagnetic insulating material which is similar to that of the insulating layers 12 and 13. The insulating layer 23 is made of, for example, a nonmagnetic insulating material similar to that of the insulating layer 11. The forefront ends of the insulating layers 21, 23 are, for example, recessed from the forefront end of the insulating layer 20.

The return yoke layer 24 mainly absorbs the magnetic flux which returns from the recording medium 40 to the recording head portion 100B so that the magnetic flux circulates therebetween. There is a case where not only the return yoke layer 24 but also the side shields 16A, 16B and the trailing shield 17, each serving as a write shield, may have the circulation function. The return yoke layer 24 is located on the trailing side of the side shields 16A, 16B, the trailing shield 17, and the auxiliary magnetic-pole layer 19, and extends rearward starting at the air bearing surface 30. The return yoke layer 24 is, in its front, coupled to the trailing shield 17, and coupled to the auxiliary magnetic-pole layer 19 in the back gap BG. The return yoke layer 24 is made of, for example, a magnetic material similar to that of the main magnetic-pole layer 14, and has a rectangular planar shape having the width W3, as described in FIG. 2. The return yoke layer 24 may be made of, for example, a magnetic material different from that of the main magnetic-pole layer 14.

[Configuration of Main Part of Thin-Film Magnetic Head]

Next, the configuration of the main part of the thin-film magnetic head will be described in detail with reference to FIG. 4. FIG. 4 illustrates the configuration of the end face on the air bearing surface 30 of the main part of the thin-film magnetic head indicated in FIGS. 1 to 3. In FIG. 4, for improvement in visibility among the components, shaded patterns are applied to the respective elements made of a constituent material except for an insulating material.

Each of the leading shield 8B, the insulating layer 13 serving as the leading gap, the tip portion 14A, the side gap 15, the side shields 16A, 16B, the trailing gap 18, and the trailing shield 17 has its end face exposed on the air bearing surface 30. Here, the term "each has its end face exposed on the air bearing surface 30" means that the end faces of the above-described elements are located in the plane of the air bearing surface 30.

The end face of the tip portion 14A on the air bearing surface 30 has a wider width on the trailing side compared with that on the leading side. In detail, the end face of the tip portion 14A has an edge located on the trailing side (trailing edge TE), an edge located on the leading side (leading edge LE), and two edges located between the trailing edge TE and the leading edge LE (side edges SE). This makes the end face of the tip portion 14A have the shape in which the width W1 of the trailing edge TE is larger than the width W4 of the leading edge LE. The leading edge LE is substantially a recording place in the tip portion 14A, and the width W1 of the trailing edge TE is, for example, 0.2 µm or less. The side edge SE may have a straight-line shape, a bent shape, or a curved shape. The side edge SE may have a mixed form of the straight-line, bent, and curved shapes.

In the end face of the tip portion 14A, for example, when comparing the widths W1, W4 with a width W5 at an arbitrary position between the trailing edge TE and the leading edge LE, the end face of the tip portion satisfies the relationship of W1>W4 and W1≧W5. In this case, the width W4 may be larger than zero, or may be substantially zero. The case where the width W4 is larger than zero means that the configuration of the end face includes the leading edge LE as one side. Meanwhile, the case where the width W4 is substantially zero means that the configuration of the end face includes the leading edge LE as a top of a corner section.

Figure 4:
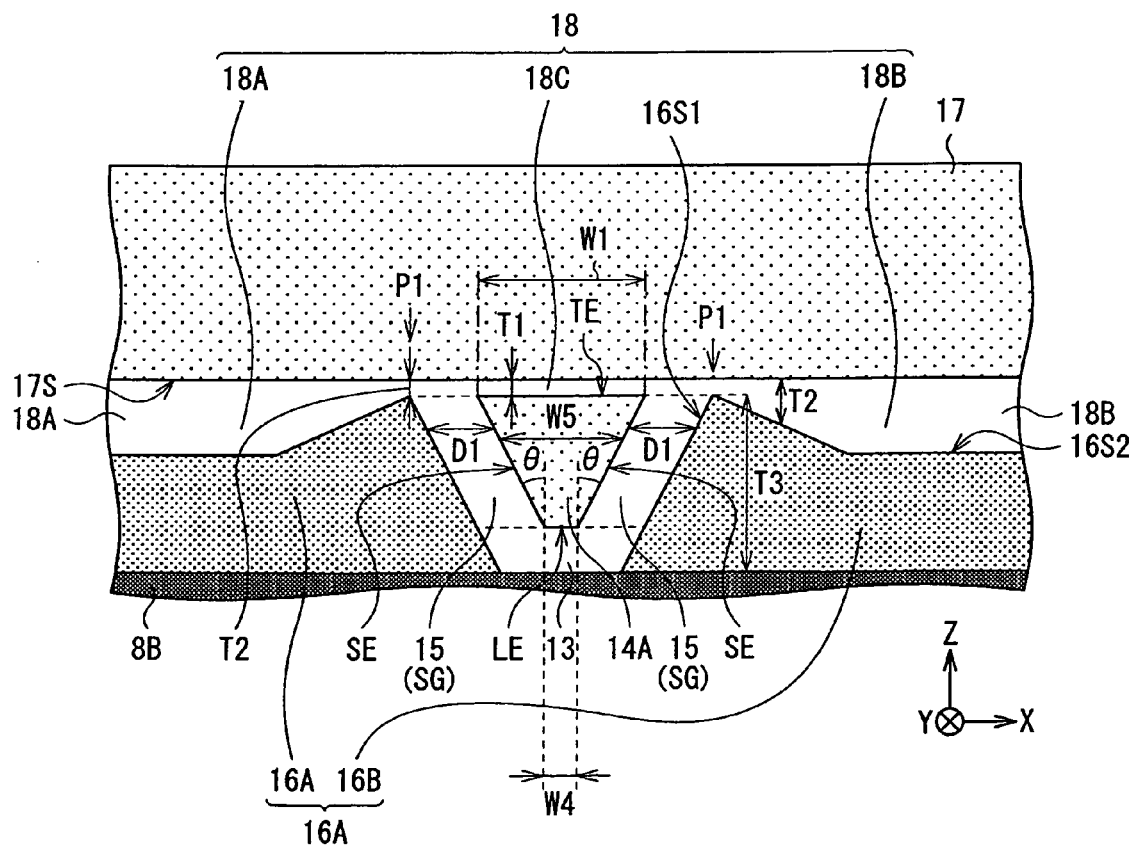
FIG. 4 is an enlarged plan view illustrating the configuration of the main part of an end face on an air bearing surface of the thin-film magnetic head illustrated in FIG. 1.

FIG. 4 illustrates an example in which the shape of the tip portion 14A is a trapezoid (inverse trapezoid) which includes the trailing edge TE as a top face (long side) and includes the leading edge LE as a bottom face (short side). In this case, a bevel angle θ (angle of a base angle) is not specifically limited.

The leading shield 8B, the side shields 16A, 16B, and the trailing shield 17 surround the tip portion 14A, with the insulating layer 13, the side gap 15, and the trailing gap 18 in between, from four sides of the leading side, the both sides in the write-track width direction (X-axis direction), and the trailing side. Here, the side shields 16A, 16B are in contact with the leading shield 8B, while being separated from the trailing shield 17 with the trailing gap 18.

It is desirable that the central portion 18C stacked between the tip portion 14A and the trailing shield 17 have a uniform thickness T1. The overall or a part of the wing portions 18A, 18B stacked between the side shields 16A, 16B and the trailing shield 17 is configured to have the thickness larger than the thickness T1. In other words, the wing portions 18A, 18B include a portion where the thickness T2 thereof, for example, becomes minimum at a position P1 closest to the tip portion 14A and increases with increasing distance from the tip portion 14A starting at the position P1 in the write-track width direction. Therefore, the thickness T2 at the position P1 is equal to or more compared with the thickness T1, whereas the thickness T2 except at the position P1 is larger than the thickness T1. Here, it is desirable that the thickness T2 at the position P1 be equal to the thickness T1. The position P1 closest to the tip portion 14A in the wing portions 18A, 18B means a position where a surface 16S1 facing the side edge SE of the tip portion 14A intersects a surface 16S2 facing the trailing shield 17. The position P1 is also a position closest to the tip portion 14A in the pair of side shields 16A, 16B. The surface 16S1 may have a straight-line shape, a bent shape, or a curved shape, or alternatively, may have a mixed form thereof.

The trailing gap 18 has the shape as described above, so that the side shields 16A, 16B, for example, include a portion where the thickness T3 thereof becomes maximum at the position P1 and decreases with increasing distance from the tip portion 14A. It is desirable that the thickness T3 be equal to the distance from the leading shield 8B, of the trailing edge TE. It is desirable that, in a surface 17S facing the tip portion 14A and the side shields 16A, 16B in the trailing shield 17, at least a regional part facing the tip portion 14A be planar. This is because linearity of the shape of recording bit (recording bit pattern) obtained at the time of recording is secured, thereby making it easier to obtain higher track density and linear recording density.

Here, a distance D1 of the side gap 15 on the air bearing surface 30 (distance between the tip portion 14A and the side shields 16A, 16B in the width direction) may be uniform, or may be varied in the thickness direction.

[Configuration of Recording Medium]

Figure 5:
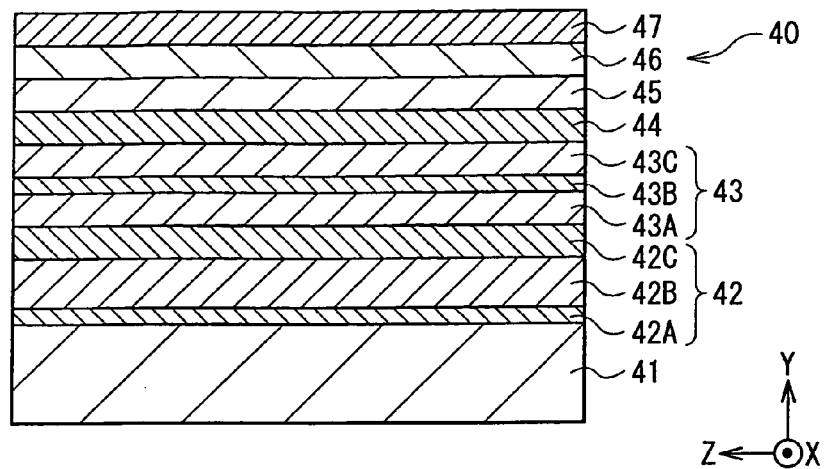
FIG. 5 is a cross-sectional view illustrating the configuration of the recording medium.

Next, the specific configuration of the recording medium 40 will be described. FIG. 5 illustrates a cross-sectional configuration of the recording medium 40.

The recording medium 40 has, for example, the configuration in which there are stacked, on the substrate 41, a flux path layer 42, a soft magnetic backing layer 43, a nonmagnetic layer 44, a hard magnetic recording layer 45, a protective layer 46, and a lubricating layer 47, in this order. The flux path layer 42 functions as a flow path of the magnetic flux in the recording medium 40, and has, for example, the configuration in which nonmagnetic layers 42A, 42C are stacked with a soft magnetic layer 42B in between. The soft magnetic backing layer 43 has, for example, the configuration in which soft magnetic layers 43A, 43C are stacked with a nonmagnetic layer 43B in between. The hard magnetic recording layer 45 is magnetized with the recording magnetic field (information is magnetically recorded).

The substrate 41 is, for example, an aluminum disk plated with nickel-phosphorus (NiP), and has an arbitrary thickness. In the flux path 42, for example, the nonmagnetic layer 42A is made of titanium (Ti: approximately 1 nm in thickness); the soft magnetic layer 42B is made of an alloy of cobalt, nickel, and iron (CoNiFe: approximately 100 nm to 200 nm in thickness); and the nonmagnetic layer 42C is made of nickel-phosphorus (approximately 100 nm in thickness), respectively. The flux path 42 has permeability higher than that of the soft magnetic backing layer 43. This is because the magnetic field (recording magnetic field) from the thin-film magnetic head strongly enters the recording medium 40, whereby the recording performance improves. Additionally, it is because the flux path is located away from the hard magnetic recording layer 45, and accordingly, exerted is less magnetic mutual interaction between the flux path and the hard magnetic recording layer 45, thereby exhibiting less concern on instability in recording (adjacent track erase or the like). In the soft magnetic backing layer 43, for example, the soft magnetic layer 43A is made of a boride alloy including iron, cobalt, zirconium, and tantalum (FeCoZrTaB: approximately 50 nm in thickness); the soft magnetic layer 43B is made of ruthenium (Ru: approximately 0.8 nm in thickness); and the soft magnetic layer 43C is made of an iron, cobalt, zirconium, and tantalum boride alloy (approximately 50 nm in thickness), respectively. The nonmagnetic layer 44 is made of, for example, a mixture (approximately 30 nm in thickness) of an alloy of ruthenium and chrome (RuCr), and silicon oxide ($SiO_2$). The hard magnetic recording layer 45 is made of, for example, a mixture (approximately 25 nm in thickness) of an alloy of cobalt, platinum, and chrome (CoPtCr); and silicon oxide ($SiO_2$). The protective layer 46 is made of, for example, carbon (approximately 2 nm in thickness). However, the configuration of the recording medium 40 is not necessarily limited to the above-described configuration.

[Operation of Thin-Film Magnetic Head]

The thin-film magnetic head operates as follows.

At the time of recording information, when a current flows from an unillustrated external circuit to the thin-film coil 22 in the recording head portion 100B, a magnetic flux J for recording (refer to FIG. 2) is generated. The magnetic flux J is accommodated in the main magnetic-pole layer 14 and the auxiliary magnetic-pole layer 19, and thereafter, flows inside the main magnetic-pole layer 14 toward the tip portion 14A. At this time, the magnetic flux J is narrowed at the flare point FP, so that the magnetic flux J is finally focused on the vicinity of the trailing edge TE. When the magnetic flux J is released outside and the recording magnetic field is generated, the hard magnetic recording layer 45 is magnetized with the recording magnetic field, resulting in the magnetic recording of information in the recording medium 40.

In the thin-film magnetic head, the current flows to the thin-film coils 10, 22 in the direction opposite from one another, so that the magnetic flux is generated therein in the direction opposite from one another. In detail, the magnetic flux for recording is generated toward the leading side in the thin-film coil 22, whereas the magnetic flux for suppressing leakage is generated toward the trailing side in the thin-film coil 10. This makes the magnetic flux for recording less likely to be leaked to the reproducing head portion 100A, so that it is suppressed that detection accuracy is lowered in the MR element 6. In addition, it is also suppressed that an unnecessary magnetic field is generated due to absorption of the magnetic flux for recording in the bottom lead shield 3 and the top lead shield 5 and the unnecessary magnetic field results in unintentional erasure of information recorded in the recording medium 40.

When the magnetic flux J is released from the tip portion 14A, a part of the magnetic flux J (spread component) is absorbed in the trailing shield 17, the side shields 16A, 16B, and the leading shield 8B, so that the spread of the recording magnetic field is suppressed, and the gradient of that recording magnetic field increases. The magnetic flux J absorbed in the trailing shield 17, the side shields 16A, 16B, and the leading shield 8B is resupplied to the main magnetic-pole layer 14 through the return yoke layer 24.

The magnetic flux J released from the main magnetic-pole layer 14 toward the recording medium 40 magnetizes the hard magnetic recording layer 45, and thereafter, returns to the return yoke layer 24 through the flux path layer 42, and is resupplied to the main magnetic-pole layer 14. This makes the magnetic flux J be circulated between the recording head portion 100B and the recording medium 40, whereby a magnetic circuit is established.

Meanwhile, at the time of reproducing information, when a sense current flows to the MR element 6 in the reproducing head portion 100A, the resistance value of the MR element 6 changes in response to a signal magnetic field for reproducing in the recording medium 40. This resistance change is detected as a voltage change, so that the information recorded in the recording medium 40 is magnetically reproduced.

[Method of Manufacturing Thin-Film Magnetic Head]

Next, a method of manufacturing the thin-film magnetic head will be described. FIGS. 6 to 17 describe processes of forming the main part, and illustrate the cross-sectional configuration corresponding to a part of FIG. 1(A). Hereinafter, with reference to FIG. 1, an outline of overall manufacturing processes will be described, and thereafter, with reference to FIGS. 1 to 17, the processes of forming the main part will be described in detail. At this time, the forming material, dimension, shape, and the like of a series of elements have been already described in detail, so that the descriptions thereof are omitted as needed.

The thin-film magnetic head is manufactured by mainly forming and stacking the series of elements in order using an existing thin-film process. The existing thin-film process includes, for example, a film formation technique such as the electrolytic plating method or the sputtering method, a patterning technique such as the photolithography method, an etching technique such as the dry etching method or the wet etching method, or a polishing technique such as the chemical mechanical polishing (CMP: chemical mechanical polishing) method.

When manufacturing the thin-film magnetic head, as indicated in FIG. 1, the insulating layer 2 is firstly formed on the substrate 1. Next, on the insulating layer 2, formed and stacked are the bottom lead shield 3, the shielding gap layer 4 where the MR element 6 is buried, and the top lead shield 5 in this order, and accordingly, the reproducing head portion 100A is formed. Then, the separating layer 7 is formed on the reproducing head portion 100A. Subsequently, on the separating layer 7, formed are the magnetic layer 8A, the insulating layer 9, and the thin-film coil 10 buried with the insulating layers 11, 12, in order. Further, the insulating layer 13 and the main magnetic-pole layer 14 are formed in order so as to cover all of the insulating layers 9, 11, and 12, as well as the thin-film coil 10. Thereafter, the side gap 15 and the trailing gap 18 are formed, and there are formed the leading shield 8B, the side shields 16A, 16B, the trailing shield 17, and the auxiliary magnetic-pole layer 19. Further, the insulating layer 20 is formed between the trailing shield 17 and the auxiliary magnetic-pole layer 19, and then, planarized are the trailing shield 17, the auxiliary magnetic-pole layer 19, and the insulating layer 20. Thereafter, on the planarized surface, formed are the thin-film coil 22 buried with the insulating layers 21, 23. Subsequently, the return yoke layer 24 is formed on the trailing shield 17, the auxiliary magnetic-pole layer 19, and the insulating layer 20, and accordingly, the recording head portion 100B is formed. Finally, the overcoat layer 25 is formed on the recording head portion 100A, and thereafter, the air bearing surface 30 is formed by collectively polishing a side face of the stacked structure from the substrate 1 to the overcoat layer 25 using the CMP method or the like. In this way, the thin-film magnetic head is completed.

[Method of Manufacturing Main Part of Thin-Film Magnetic Head]

Figure 6:
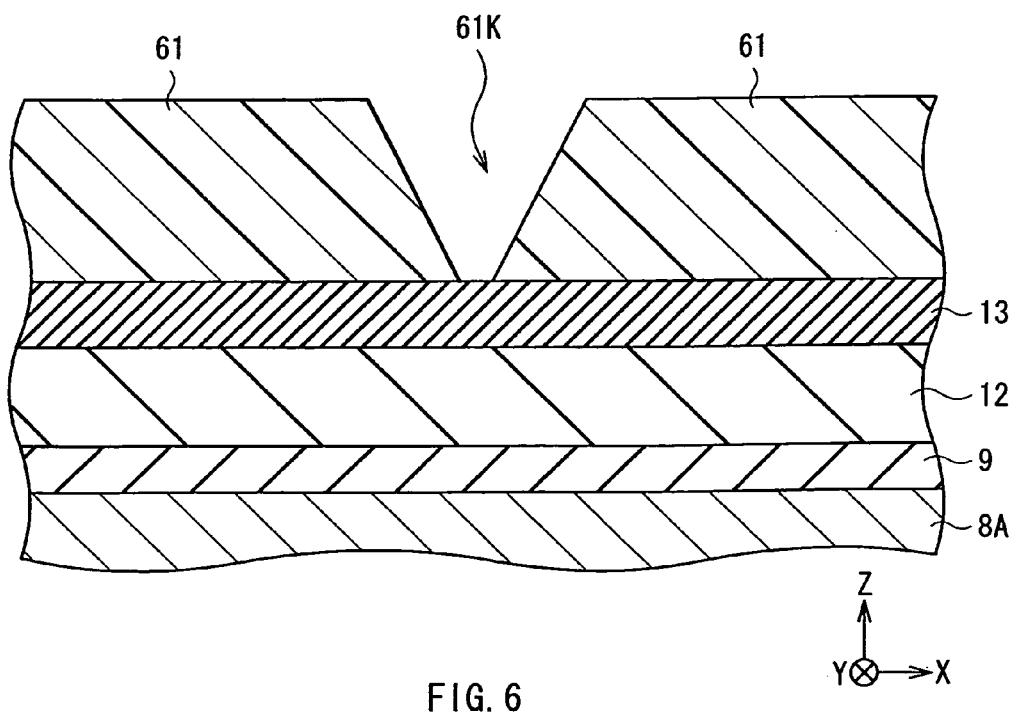
FIG. 6 is a cross-sectional view for explaining a manufacturing process of the main part of the thin-film magnetic head.

The main part of the thin-film magnetic head is, for example, formed as follows. Firstly, as illustrated in FIG. 6, a photoresist pattern 61 having an opening 61K is formed on the insulating layer 13 serving as a base. Here, a photoresist film is formed by applying photoresist onto a surface of the insulating layer 13, and thereafter, the photoresist film is patterned (exposed and developed) using the photolithography method. Additionally, the photoresist film is formed in such a manner that the insulating layer 13 is exposed to the opening 61K and the opening 61K is wider on the side away from the insulating layer 13, compared with the side close thereto.

Figure 7:
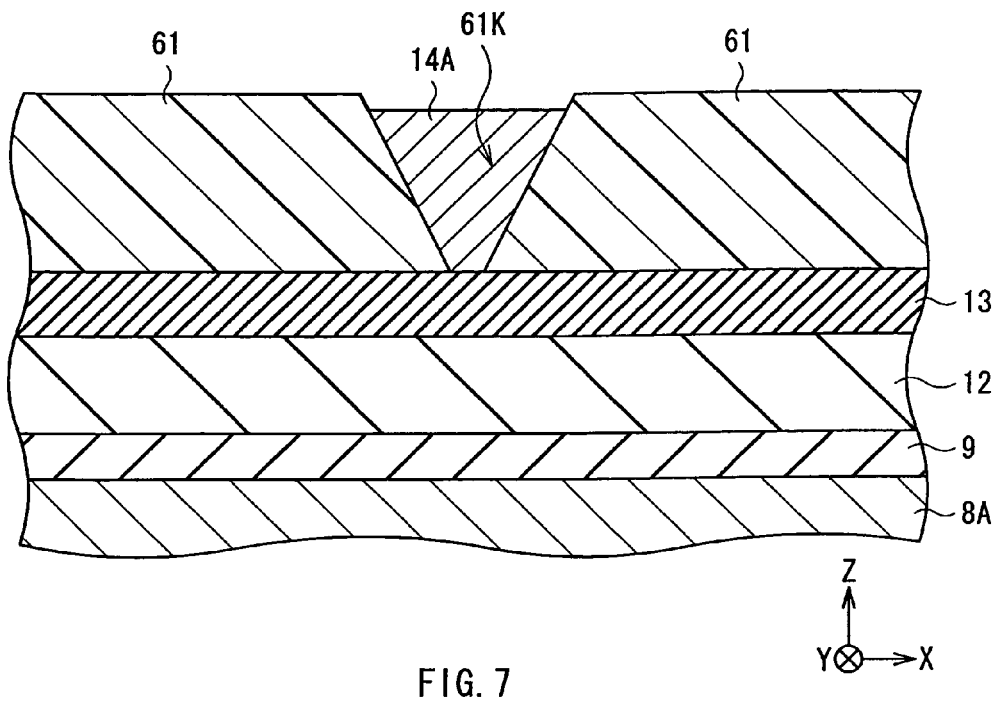
FIG. 7 is a cross-sectional view for explaining a process subsequent to FIG. 6.

Next, as illustrated in FIG. 7, the tip portion 14A is formed in the opening 61K using the electrolytic plating method or the like. In this case, for example, a seed layer (not illustrated) is formed, and thereafter, by using the seed layer as an electrode film, a plating film is deposited. Instead of the electrolytic plating method, the sputtering method or the like may be used.

Figure 8:
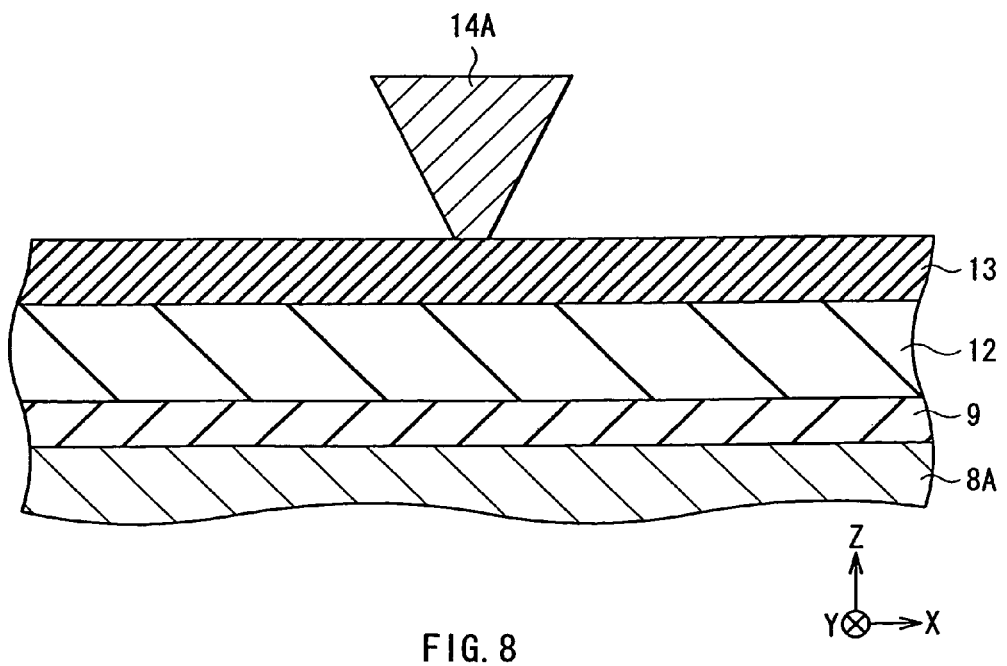
FIG. 8 is a cross-sectional view for explaining a process subsequent to FIG. 7.

Subsequently, as illustrated in FIG. 8, both sides of the tip portion 14A are exposed by removing the photoresist pattern 61.

Figure 9:
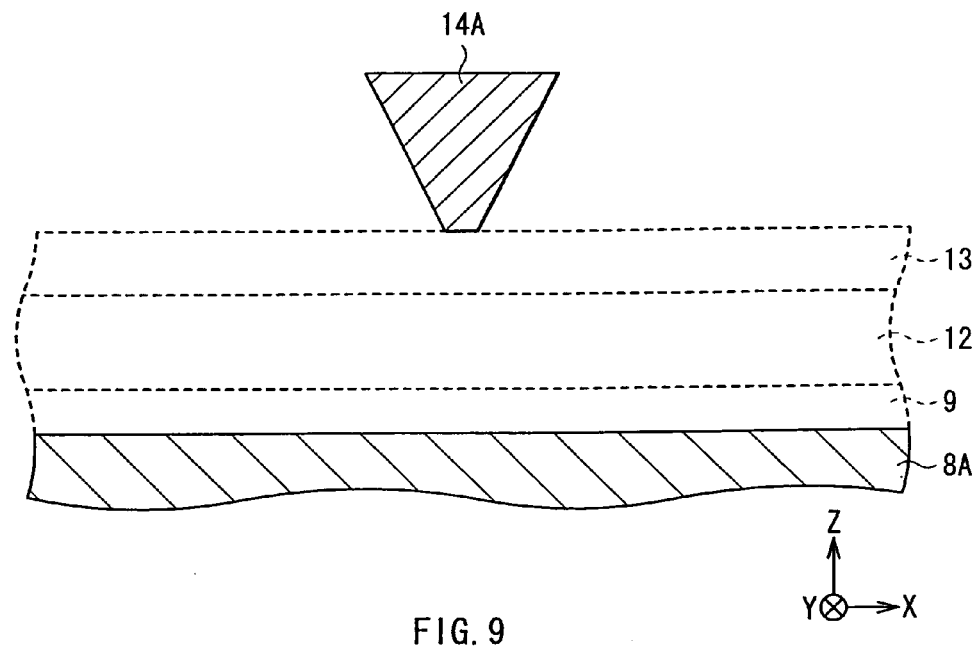
FIG. 9 is a cross-sectional view for explaining a process subsequent to FIG. 8.

Next, as illustrated in FIG. 9, selectively removed are a region overlapping the tip portion 14A in the thickness direction (Z-axis direction), and the insulating layers 12, 13 in a region on both sides of the region overlapping the tip portion 14A. Specifically, removed are all of the insulating layers 9, 12, and 13 in a region included in the range of the width W3 centering on the tip portion 14A in the write-track width direction (X-axis direction). Here, when, for example, the insulating layers 9, 12, and 13 are made of alumina, the insulating layers are dissolved and removed using a predetermined solvent (e.g., alkaline solution). As a result, a surface of the magnetic layer 8A is exposed, and the tip portion 14A is in a hollow state.

Figure 10:
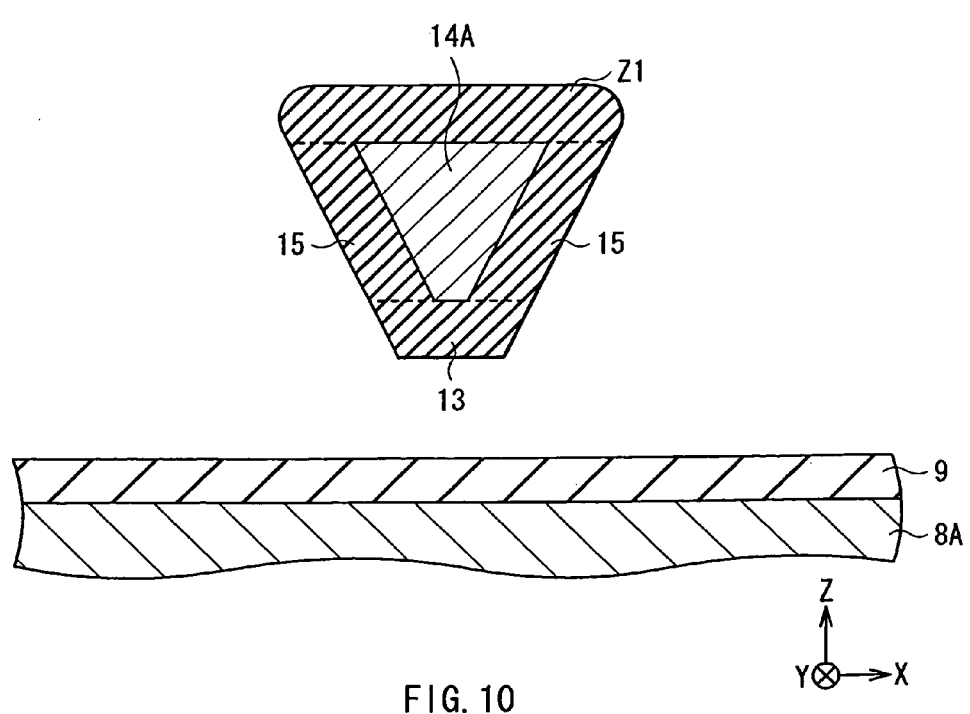
FIG. 10 is a cross-sectional view for explaining a process subsequent to FIG. 9.

After the removal of the insulating layers 9, 12, and 13 in the region in the vicinity of the tip portion 14A, as illustrated in FIG. 10, an insulating material such as alumina is applied to the tip portion 14A so as to surround the periphery thereof using the chemical vapor deposition (CVD: Chemical Vapor Deposition) method or the atomic layer deposition (ALD: Atomic Layer deposition) method. This leads to the formation of an insulating film Z1 including the side gap 15 and the insulating layer 13 serving as the leading gap. At this time, the insulating material is simultaneously deposited also on the surface of the magnetic layer 8A, and the insulating layer 9 is formed again.

Figure 11:
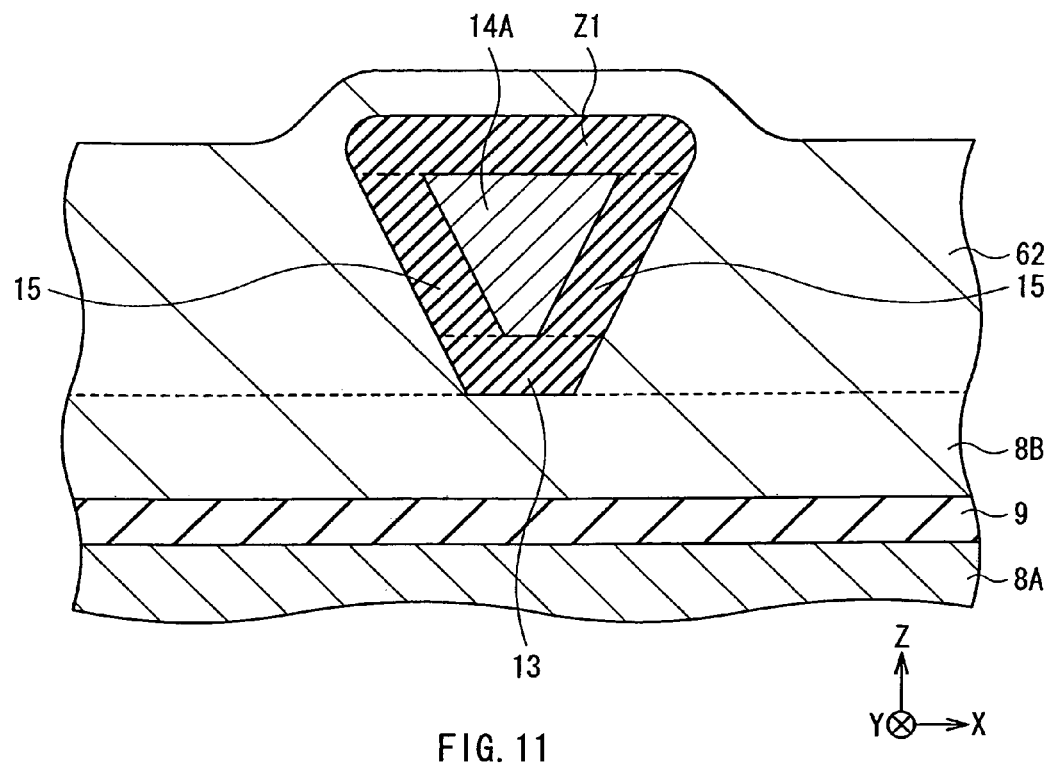
FIG. 11 is a cross-sectional view for explaining a process subsequent to FIG. 10.

Next, as illustrated in FIG. 11, a magnetic layer 62 is formed so as to cover the overall, as well as to completely bury the tip portion 14A and the insulating film Z1 in the magnetic layer 62, using the electrolytic plating method or the like. In the magnetic layer 62, a portion located on the leading side compared with the insulating layer 13 (portion in contact with the insulating layer 9) is the leading shield 8B.

Figure 12:
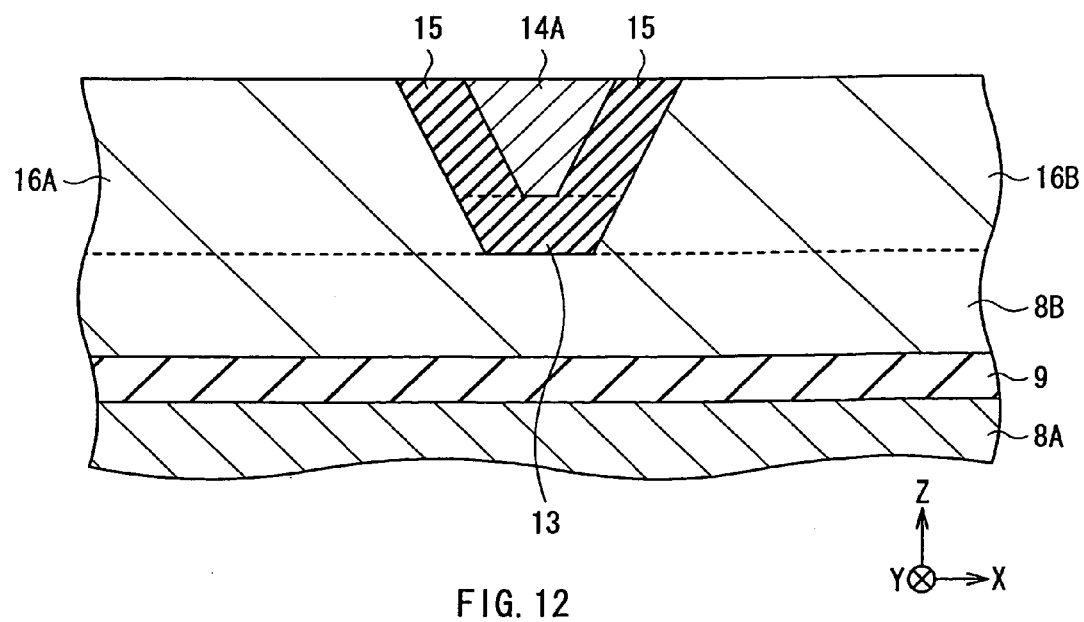
FIG. 12 is a cross-sectional view for explaining a process subsequent to FIG. 11.

Then, the magnetic layer 62 and the insulating film Z1 are polished and planarized until the tip portion 14A is exposed, using the chemical mechanical polishing (CMP: Chemical Mechanical Polishing) method, the milling method, or the like. In this case, the polishing may be excessively performed in order to unfailingly expose the tip portion 14A, as needed. This leads to the formation of the side shields 16A, 16B on both sides of the tip portion 14A, with the side gap 15 in between, as illustrated in FIG. 12.

Figure 13:
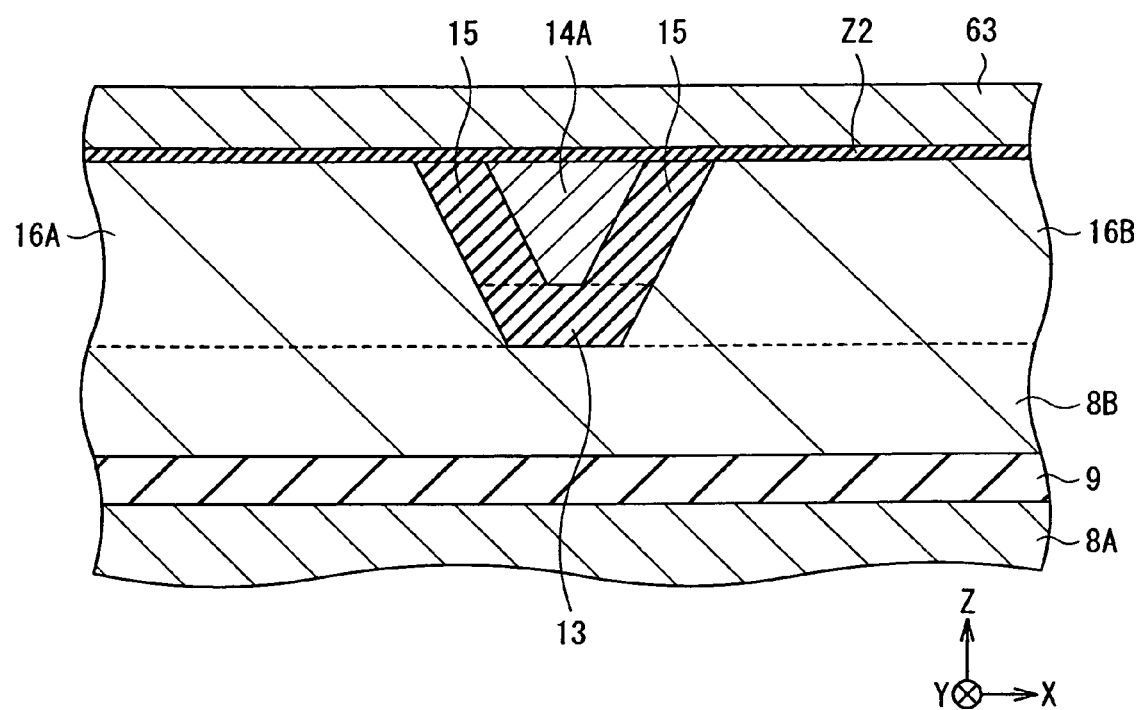
FIG. 13 is a cross-sectional view for explaining a process subsequent to FIG. 12.

Subsequently, as illustrated in FIG. 13, on the tip portion 14A, the side gap 15, and the side shields 16A, 16B, formed is an insulating film Z2 which will be a part of the trailing gap 18 later, using the sputtering method or the like. Further, on the insulating film Z2, formed is a magnetic layer 63 which will be a part of the trailing shield 17 later, using the sputtering method or the like.

Figure 14:
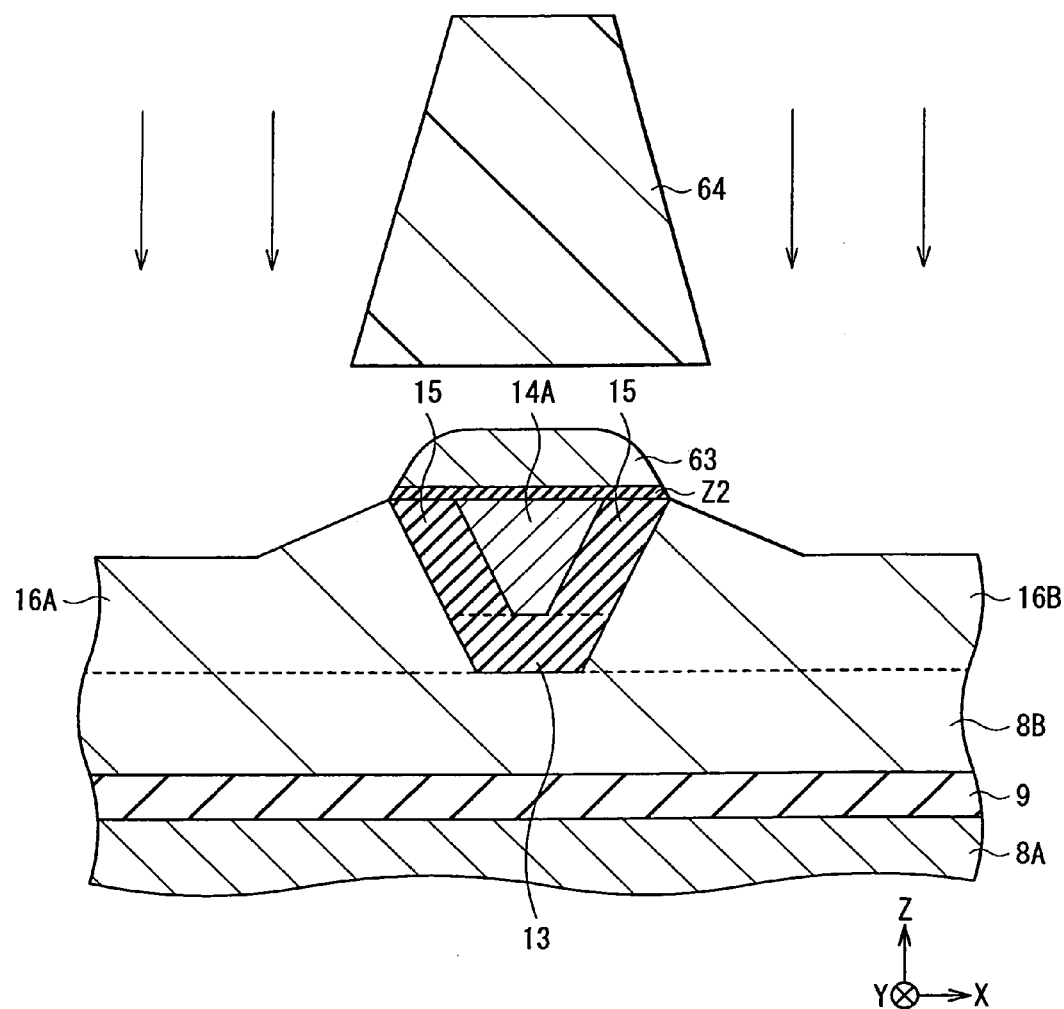
FIG. 14 is a cross-sectional view for explaining a process subsequent to FIG. 13.

Next, as illustrated in FIG. 14, above the tip portion 14A, formed is a suspension-bridge shaped mask 64 spaced apart from the magnetic layer 63, and thereafter, etched are the magnetic layer 63, the insulating film Z2, and the like in an unprotected region not protected by the mask 64, using the ion milling method or the like. At this time, to such an extent that the side gap 15 is not etched, the width of the mask 64 is set, or a relative position between the mask 64 and the tip portion 14A is aligned. In addition, an irradiation angle of an ion beam is adjusted as that the ion beam is irradiated onto a surface of the magnetic layer 63 in the oblique direction.

In the etching process, in the unprotected region not hidden behind the mask 64, a part of the respective side shields 16A, 16B is also dug down (a part of the respective side shields is removed in the thickness direction), in conjunction with the etching of the magnetic layer 63 and the insulating film Z2. In other words, in the unprotected region, the magnetic layer 63 and the insulating film Z2 are removed in order, and thereafter, the side shields 16A, 16B are dug down, so that the thickness of the sides shields 16A, 16B is reduced. In this case, an etched material (constituent material of the etched side shields 16A, 16B) is apt to be again deposited (reattached) on the side close to the mask 64 compared with the side away therefrom, so that the thickness of the side shields 16A, 16B is small on the side away from the tip portion 14A compared with the side close thereto. Additionally, the etching process makes a residual portion of the insulating film Z2 appear as the central portion 18C in the trailing gap 18.

Figure 15:
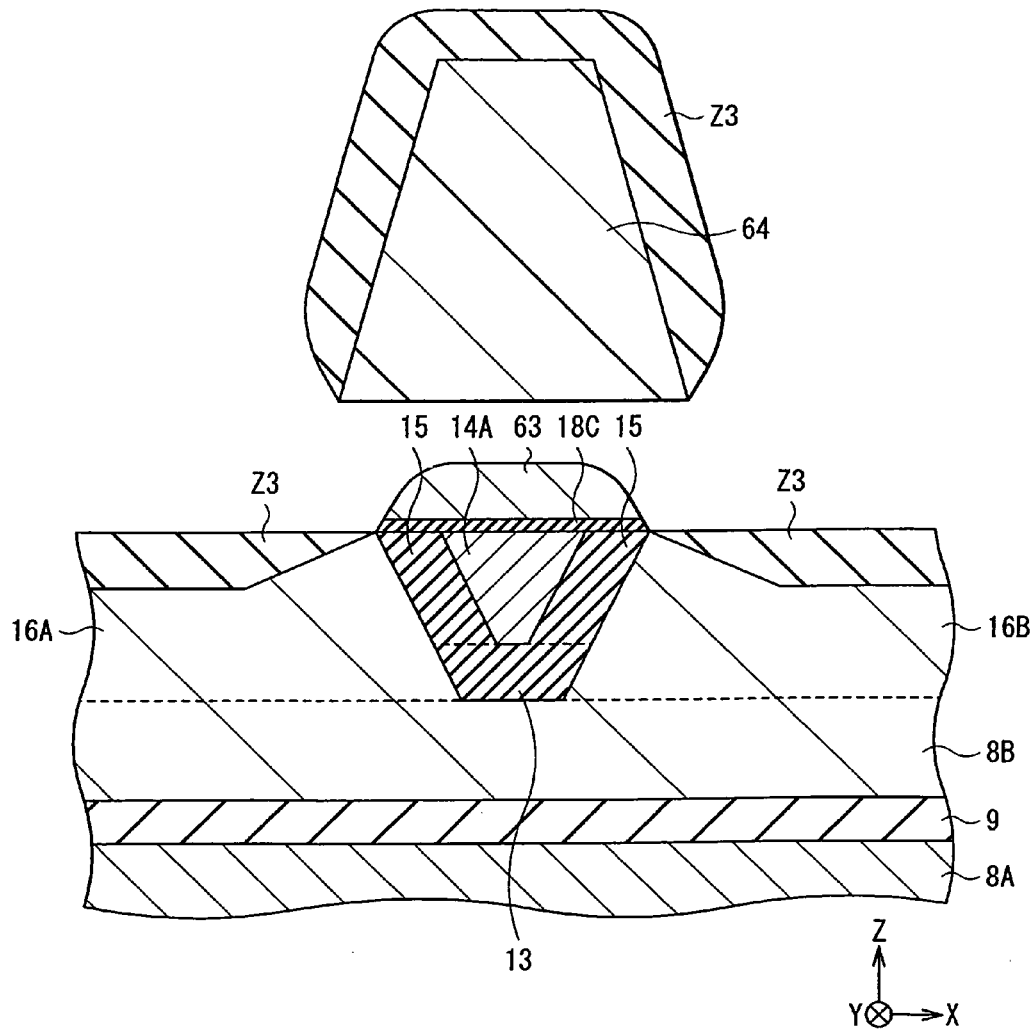
FIG. 15 is a cross-sectional view for explaining a process subsequent to FIG. 14.

Then, as illustrated in FIG. 15, an insulating film Z3 made of alumina or the like is formed so as to bury the dug-down portion in the side shields 16A, 16B. At this time, the amount of attachment is adjusted such that an upper surface of the insulating film Z3 covering the side shields 16A, 16B is coincident with that of the central portion 18C.

Figure 16:
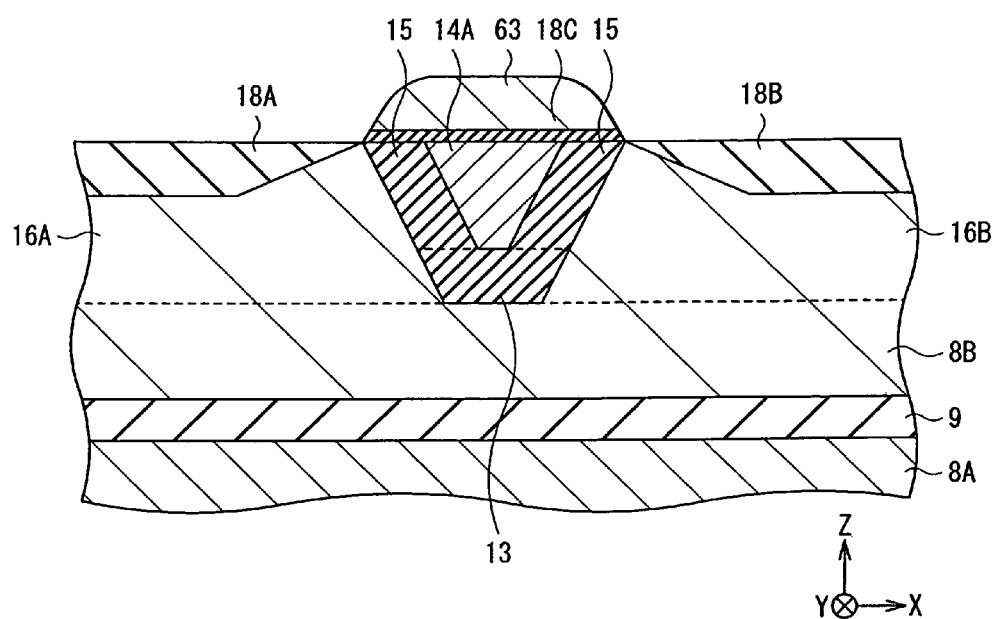
FIG. 16 is a cross-sectional view for explaining a process subsequent to FIG. 15.

Subsequently, as illustrated in FIG. 16, the removal of the mask 64 results in an appearance of the residual insulating film Z3 as the wing portions 18A, 18B arranged with the central portion 18C in between, so that the trailing gap 18 is completed.

Figure 17:
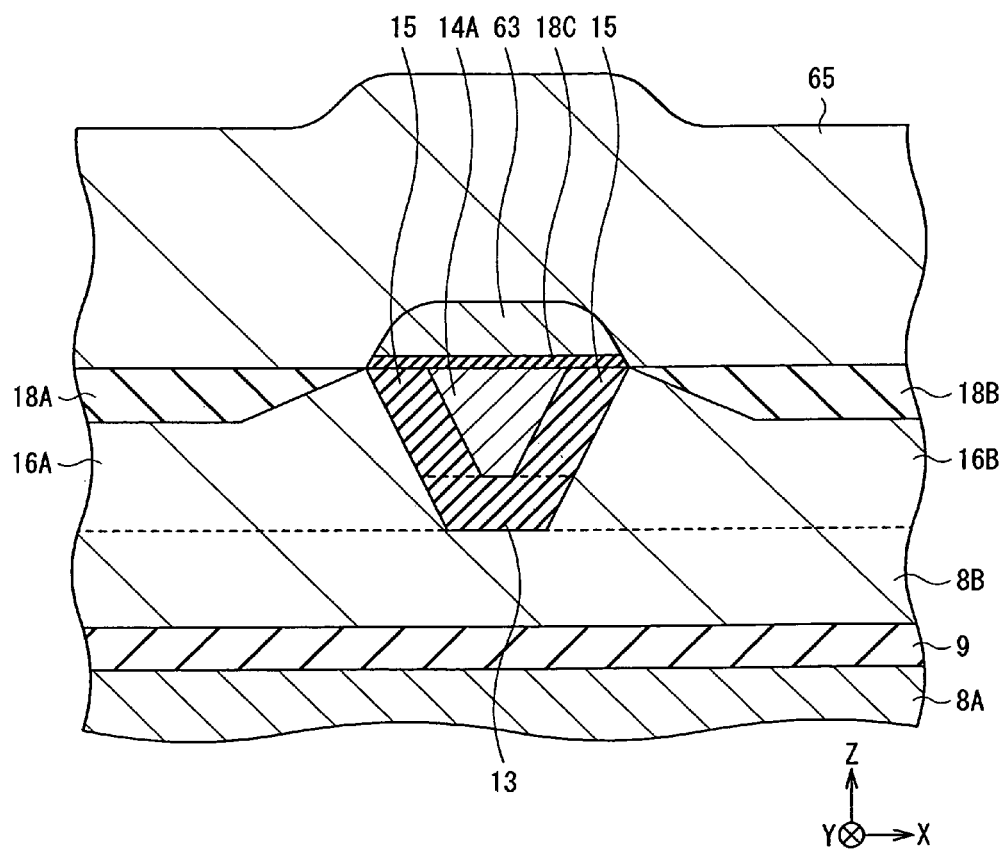
FIG. 17 is a cross-sectional view for explaining a process subsequent to FIG. 16.

Afterward, as illustrated in FIG. 17, a magnetic layer 65 is formed so as to cover the wing portions 18A, 18B and the magnetic layer 63, using the electrolytic plating method or the like. In this case, the insulating layer 65 has the thickness sufficient for completely burying therein steps formed with the wing portions 18A, 18B and the magnetic layer 63 in order to planarize the magnetic layer 65 in the subsequent process.

Finally, using the CMP method or the like, the magnetic layer 65 is polished and planarized until a portion located above the tip portion 14A has the desired thickness, and thereafter, the air bearing surface 30 is formed, whereby the trailing shield 17 is formed as illustrated in FIG. 4. As a result, the main part of the thin-film magnetic head is completed.

[Another Method of Manufacturing Main Part of Thin-Film Magnetic Head]

Figure 18:
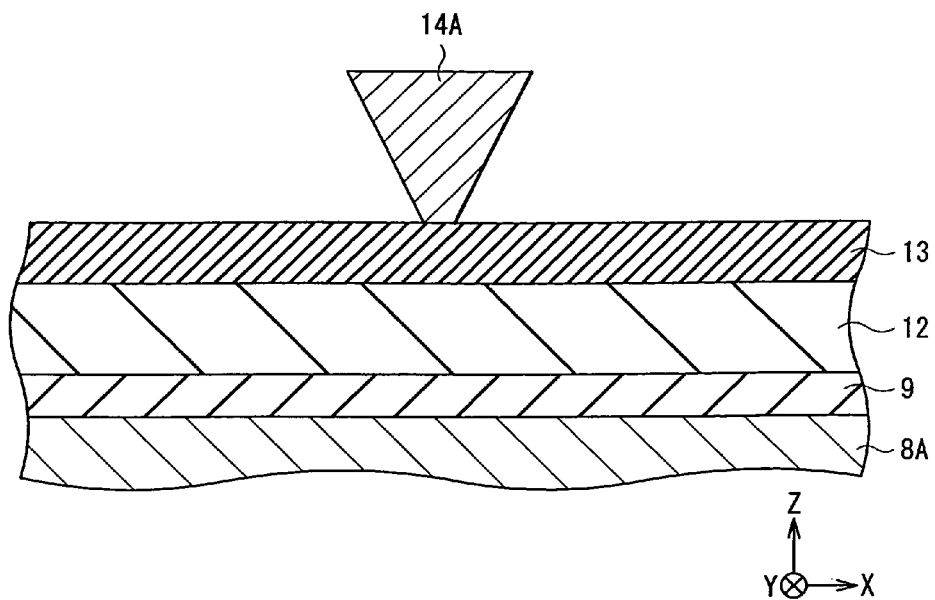
FIG. 18 is a cross-sectional view for explaining another manufacturing process of the main part of the thin-film magnetic head.

It is also possible to manufacture the main part of the thin-film magnetic head as follows. For example, as illustrated in FIG. 18, the leading shield 8B is preliminarily formed on the insulating layer 9 using the electrolytic plating method or the like, and thereafter, the insulating layer 13 is formed. Afterward, the tip portion 14A in the main magnetic-pole layer 14 is formed in accordance with the procedure described in FIGS. 6 to 8.

Figure 19:
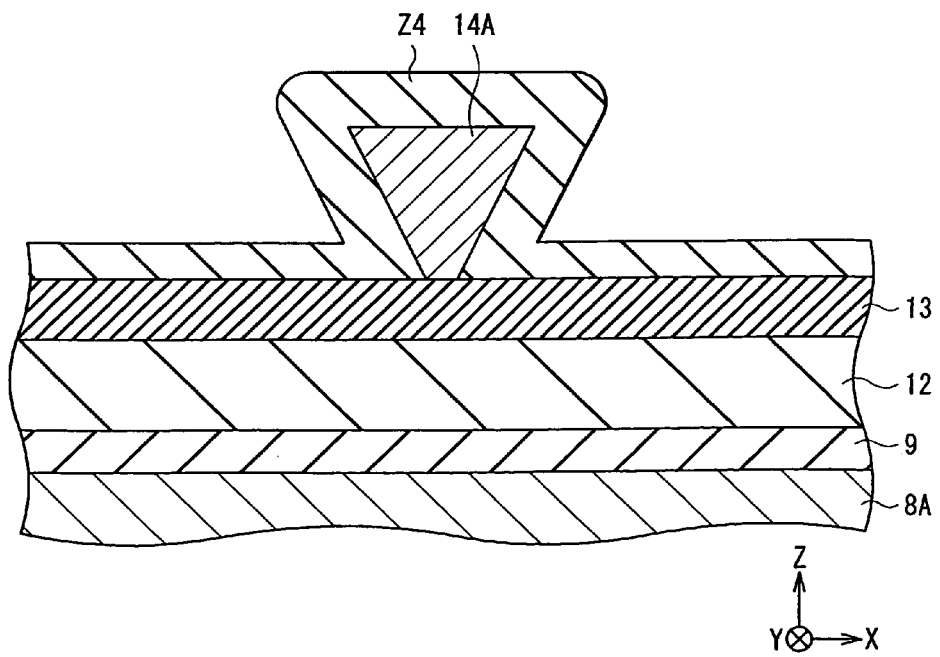
FIG. 19 is a cross-sectional view for explaining a process subsequent to FIG. 18.

After the formation of the tip portion 14A, as illustrated in FIG. 19, an insulating film Z4 made of an insulating material such as alumina is formed so as to surround the periphery of the tip portion 14A and to cover also the surface of the insulating layer 13, using the CVD method or the ALD method. The insulating film Z4 will be the side gap 15 later.

Figure 20:
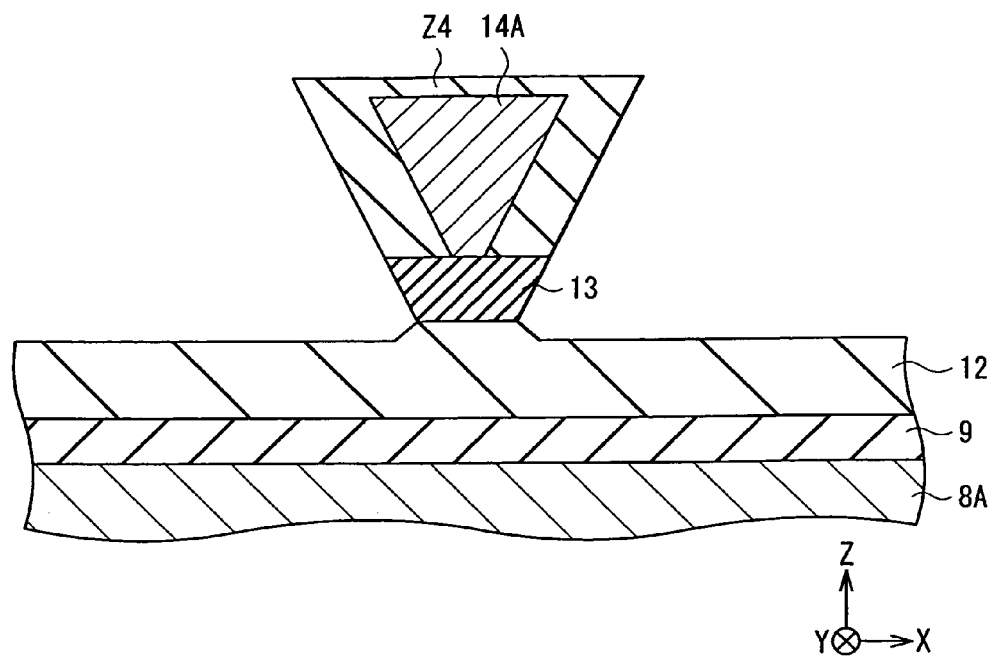
FIG. 20 is a cross-sectional view for explaining a process subsequent to FIG. 19.

Next, as illustrated in FIG. 20, after removing portions of the insulating film Z4 except for a portion surrounding the tip portion 14A through the use of the milling or the like, the insulating layer 13 in a region on both sides in the write-track width direction, of the tip portion 14A, is further removed, and the leading shield 8B is exposed. Here, in order to unfailingly expose the leading shield 8B, overetching is performed as needed.

Figure 21:
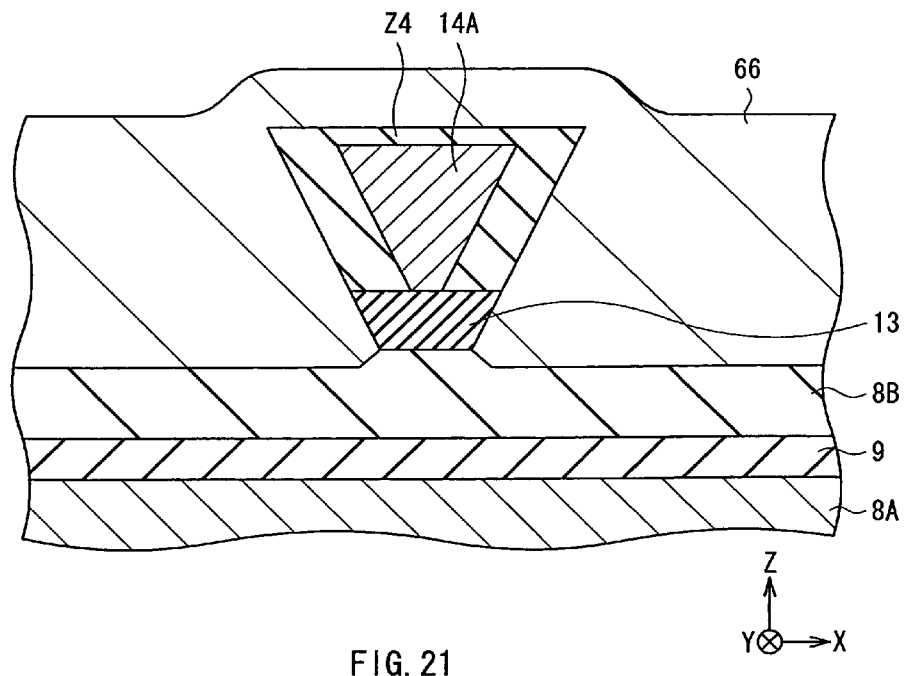
FIG. 21 is a cross-sectional view for explaining a process subsequent to FIG. 20.

Subsequently, as illustrated in FIG. 21, a magnetic layer 66 is formed, using the electrolytic plating method or the like, so as to cover the overall, and to completely bury the tip portion 14A and the insulating film Z4.

Figure 22:
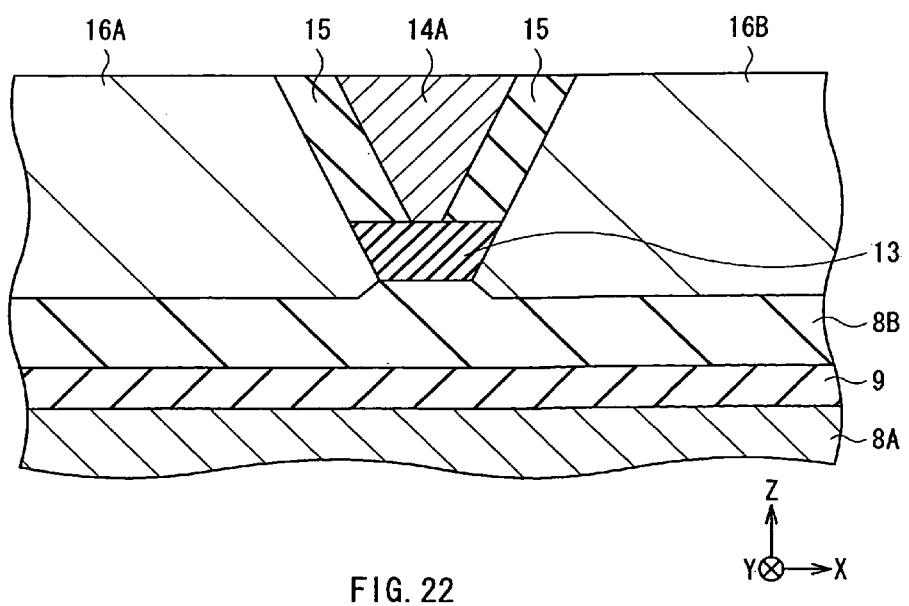
FIG. 22 is a cross-sectional view for explaining a process subsequent to FIG. 21.

Further, the shielding layer 66 and the insulating film Z4 are polished and planarized until the tip portion 14A is exposed, using the CMP method or the milling method. In this case, the polishing may be excessively performed in order to unfailingly expose the tip portion 14A, as needed. This leads to the formation of the side shields 16A, 16B on both sides of the tip portion 14A, with the side gap 15 in between, as illustrated in FIG. 22.

Afterward, through predetermined processes in accordance with procedures described in the above-described FIGS. 13 to 17, the main part of the thin-film magnetic head is completed.

[Operation and Effects of Thin-Film Magnetic Head]

In the thin-film magnetic head according to the present embodiment, the tip portion 14A, the pair of side shields 16A, 16B, and the trailing shield 17 are mutually separated by the side gap 15 or the trailing gap 18. Moreover, in the trailing gap 18, the wing portions 18A, 18B which separate the side shields 16A, 16B from the trailing shield 17 have the thickness equal to or more than the thickness of the central portion 18C which separates the trailing edge TE of the tip portion 14A from the trailing shield 17. These make it likely for the spread component to be absorbed in the portion in the vicinity of the trailing edge TE in the side shields 16A, 16B, and make it less likely for the magnetic flux to be excessively absorbed in the portions except for the portion in the vicinity of the trailing edge. As a result, realized are both ensuring the magnitude in the recording magnetic field and suppressing the spread of the recording magnetic field, allowing for the improvement in the recording performance.

In detail, in the recording processing of the perpendicular magnetic recording method, the magnetic flux flowing inside the main magnetic-pole layer 14 is narrowed at the flare point FP, as described above, and then, flows into the tip portion 14A, so that the magnetic flux is likely to spread in the vicinity of the tip portion 14A. Such tendency is prominent especially in the vicinity of the trailing edge TE. In order to suppress the spread of the recording magnetic field, it is effective to sufficiently absorb the spread component of the magnetic flux with the side shields 16A, 16B, by arranging the side shields 16A, 16B close to the tip portion 14A in the write-track width direction. However, in the meanwhile, when the side shields 16A, 16B have the predetermined thickness, the closer to the tip portion 14A the side shields 16A, 16B are arranged, the more the magnitude of the recording magnetic field is reduced. Therefore, like the present embodiment, the side shields 16A, 16B are configured to have the maximum thickness in the vicinity of the tip portion 14A and to include the portion where the thickness reduces with increasing distance from the tip portion 14A, thereby allowing it to suppress the excessive absorption of the magnetic flux and avoid the reduction in the magnitude of the recording magnetic field. In the present embodiment, thus, realized are both ensuring the magnitude of the recording magnetic field and suppressing the spread of the recording magnetic field. Moreover, the recording magnetic field is less likely to reach the adjacent track at the time of recording, so that the adjacent track erase is less likely to occur, and the recording bit pattern is narrowed to have a straight-line shape, so that the quality of the recording bit is improved. Thus, the track density and the linear recording density improve while ensuring the magnitude of the recording magnetic field, so that it is possible to improve the recording performance.

In the method of manufacturing the thin-film magnetic head according to the embodiment, there is formed the tip portion 14A having the cross-sectional configuration in which the width W1 of the trailing edge TE is larger than the width W4 of the leading edge LE, and the periphery of the tip portion 14A is surrounded with the insulating film Z1 (Z4), and thereafter, the magnetic layer 62 (66) is formed so as to bury therein the tip portion 14A, using the electrolytic plating method or the like. Afterward, the magnetic layer 62 (66) is dug down using the suspension-bridge shaped mask 64, so that it is possible to manufacture, with ease and better reproducibility, the side shields 16A, 16B including the portion where the thickness reduces with increasing distance from the tip portion 14A. It is, thus, possible to manufacture, with ease and better reproducibility, the thin-film magnetic head which exerts the above-described favorable recording performance.

[Modification of Configuration of Thin-Film Magnetic Head]

Next, some modifications of the configuration of the thin-film magnetic head according to the embodiment will be described.

(Modification 1)

This modification, as illustrated in FIGS. 23A, 23B, has the configuration in which the leading shield 8B is coupled to the magnetic layer 8A extending rearward from the air bearing surface 30. Here, the thin-film coil 10 is provided so as to penetrate a space surrounded with the leading shield 8B, the magnetic layer 8A, and the main magnetic-pole layer 14. In this modification, it is possible for the recording magnetic field in the vicinity of the trailing edge TE in the thickness direction to have the gradient comparable with the gradient of the thin-film magnetic head in FIG. 4, and further, is possible to decrease the WATE effective magnetic field. This makes it more unlikely to cause the adjacent track erase in a wide range.

[Modification 2]

Figures 24A, 24B:
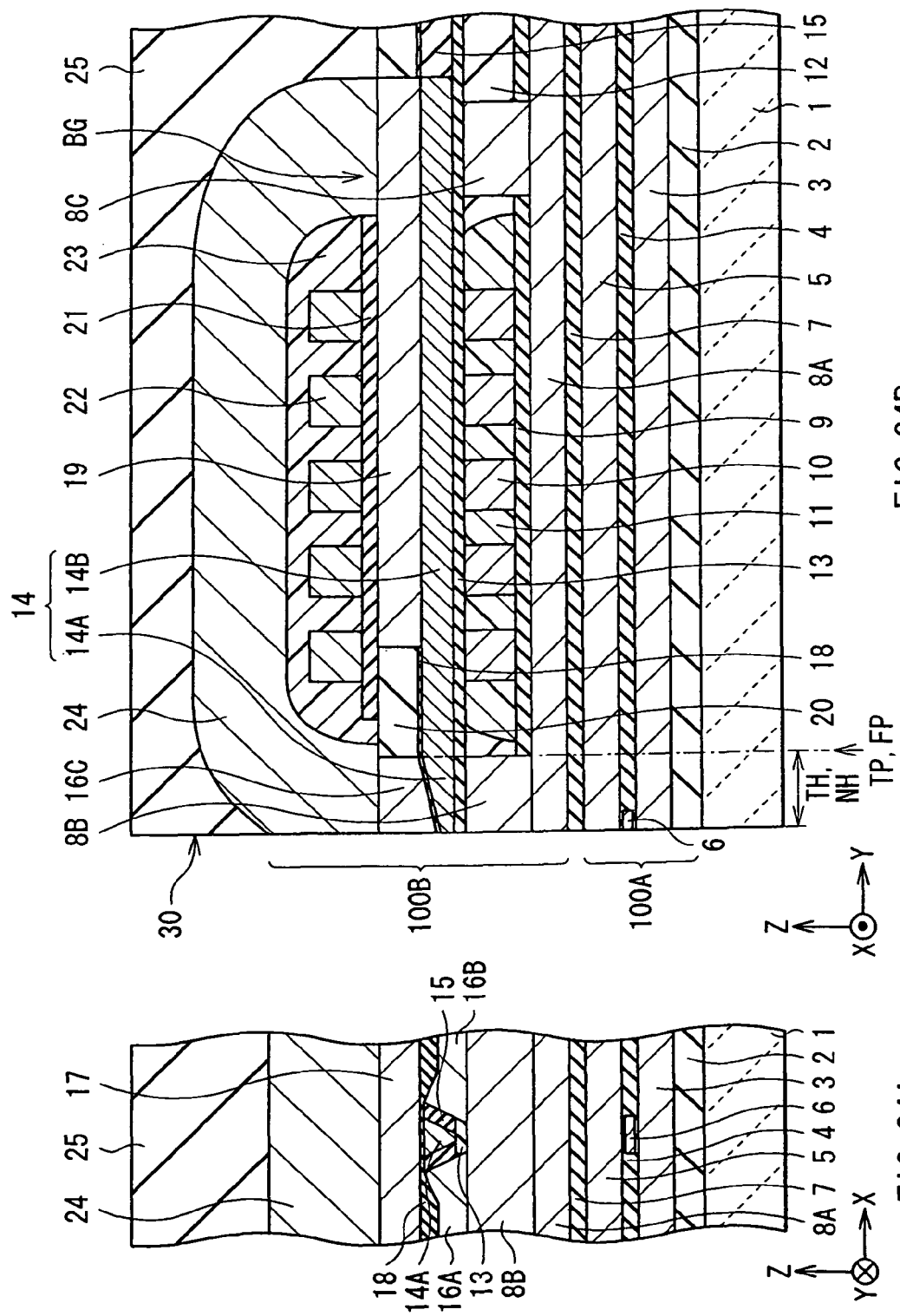
FIG. 24 is a cross-sectional view for explaining a second modification with respect to the configuration of the thin-film magnetic head.

This modification, as illustrated in FIGS. 24A, 24B, similarly to Modification 1, has the configuration in which the leading shield 8B is coupled to the magnetic layer 8A. Moreover, this modification includes a magnetic layer 8C which extends in the thickness direction toward the rear end portion 14B of the main magnetic-pole layer 14 from a rear end portion in the magnetic layer 8A. The magnetic layer 8C is made of, for example, a constituent material similar to that of the magnetic layer 8A or the leading shield 8B. However, an end portion on the opposite side of the magnetic layer 8A is separated from the rear end portion 14B with the insulating layer 13. Here, the thin-film coil 10 is provided so as to penetrate the space surrounded with the leading shield 8B, the magnetic layers 8A, 8C, and the main magnetic-pole layer 14. Also in this case, it is possible to decrease the WATE effective magnetic field, so that it is more unlikely to cause the adjacent track erase in a wide range.

(Modification 3)

This modification, as illustrated in FIGS. 25A, 25B, similarly to Modification 2, has the configuration in which the leading shield 8B is coupled to the magnetic layer 8A, and further, includes the magnetic layer 8C coupled to the rear end portion of the magnetic layer 8A. However, in the present modification, another end of the magnetic layer 8C is coupled to the rear end portion 14B of the main magnetic-pole layer 14. Also in this case, it is possible to decrease the WATE effective magnetic field, so that it is more unlikely to cause the adjacent track erase in a wide range.

Like Modifications 1 to 3 described above, the magnetic layers 8A, 8C are arranged around the thin-film coil 10 located on the leading side of the main magnetic-pole layer 14, and the positions thereof are adjusted, thereby allowing it to control the inductance of the thin-film coil 10. This control of the inductance enables it to control the amount of the magnetic flux in the recording magnetic field flowing on the leading side, so that it is possible to, for example, balance the gradient of the recording magnetic field toward the trailing side with the WATE effective magnetic field. Specifically, the larger the inductance of the thin-film coil 10 is, the more the recording magnetic field flows to the leading side. In this case, although the gradient of the recording magnetic field toward the trailing side is small, a magnetic flux concentration toward the trailing side is alleviated, so that the WATE effective magnetic field is decreased.

[Configuration of Magnetic Recording Device Equipped With Thin-Film Magnetic Head]

Figure 26:
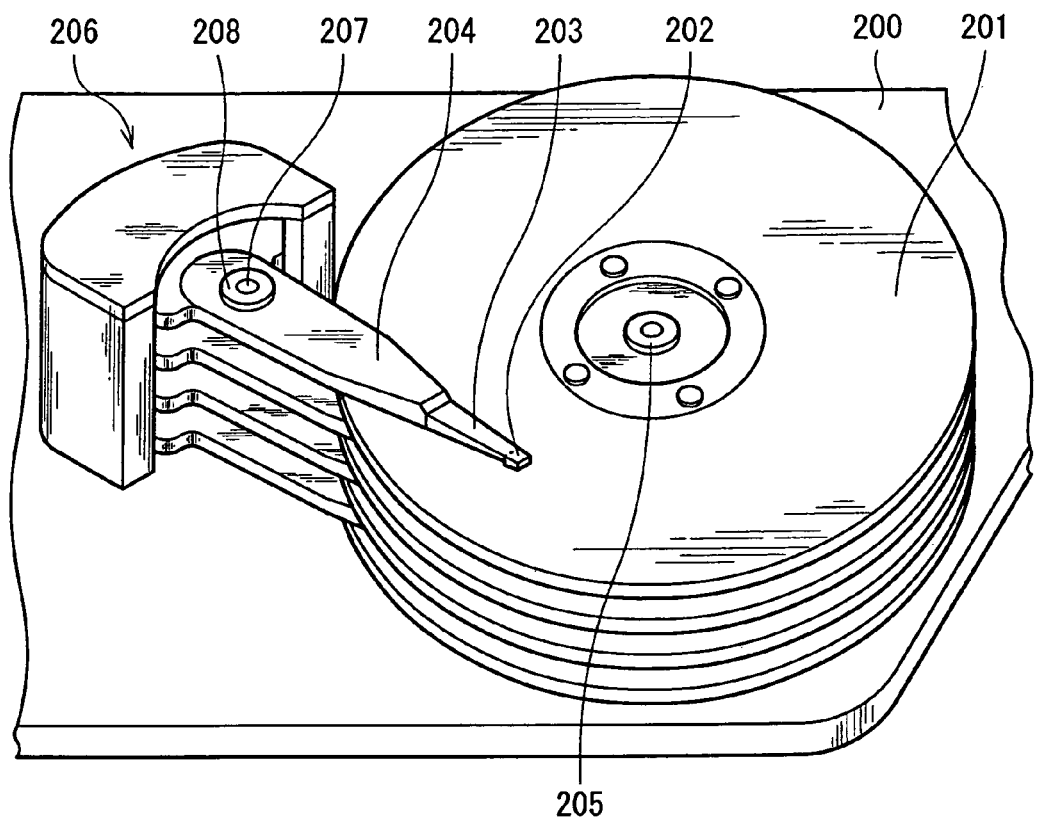
FIG. 26 is a perspective view illustrating the configuration of a magnetic recording device mounted with the thin-film magnetic head.
Figure 27:
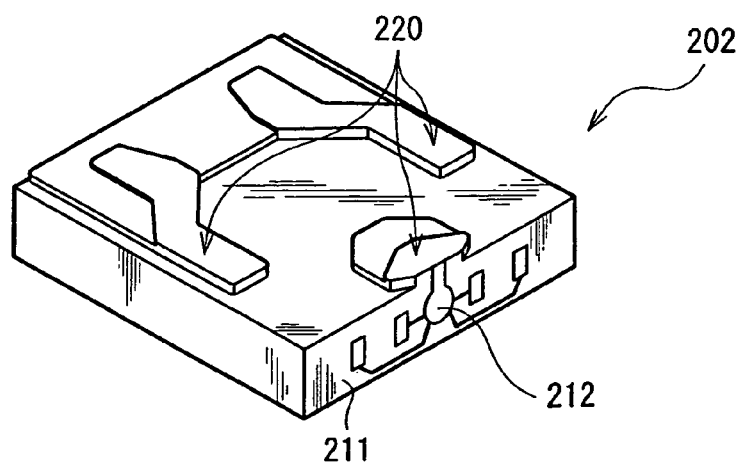
FIG. 27 is an enlarged perspective view illustrating the configuration of a main part of the magnetic recording device.

Next, the configuration of a magnetic recording device mounted with the thin-film magnetic head will be described. FIGS. 26 and 27 illustrate the configuration of the magnetic recording device. FIG. 26 illustrates the overall perspective configuration, and FIG. 27 illustrates the perspective configuration of the main part, respectively.

As illustrated in FIG. 26, for example, the magnetic recording device is a hard disk drive, and includes, in a housing 200, a plurality of magnetic disks (hard disks) 201 correspond to the recording medium 40 (refer to FIG. 3), a plurality of suspensions 203 each of which is provided in a prescribed arrangement corresponding to the respective magnetic disks 201 and supports a magnetic head slider 202 at one end, and a plurality of arms 204 each of which supports the other end of the respective suspension 203. The magnetic disk 201 is rotatable about a spindle motor 205 fixed to the case 200. The arm 204 is connected to a drive section 206 serving as a power source, and is pivotable about a fixed shaft 207 fixed to the case 200, through a bearing 208. The drive section 206 includes a drive source such as a voice coil motor. The magnetic recording device is, for example, a model in which the plurality of arms 204 are integrally pivotable about the fixed axle 207. For better visualization of the internal configuration of the magnetic recording device, FIG. 26 illustrates the case 200 with partial cutouts.

For example, the magnetic head slider 202 has, as illustrated in FIG. 27, the configuration in which a thin-film magnetic head 212 which is the above-described thin-film magnetic head is attached on one surface of a substrate 211 having a generally rectangular solid structure made of a nonmagnetic insulating material such as altic. On one surface of the substrate 211 (air bearing surface 220), for example, there is provided a concave-convex structure for reducing the air resistance generated when the arm 204 pivots. On the other surface of the substrate 211 (surface on the right front side in FIG. 27) which intersects the air bearing surface 202, the thin-film magnetic head 212 is attached. When the magnetic disk 201 rotates at the time of recording or reproducing information, the magnetic head slider 202 floats from a recording surface of the magnetic disk 201 (surface which faces the magnetic head slider 202) by utilizing air flow generated between the recording surface of the magnetic disk 201 and the air bearing surface 220. For better visualization of the structure on the air bearing surface 220 side in the magnetic head slider 202, FIG. 27 illustrates the structure turned upside down compared with FIG. 26.

In the magnetic recording device, the arm 204 pivots at the time of recording or reproducing information, whereby the magnetic head slider 202 moves to a predetermined region (recording region) in the magnetic disk 201. Then, when the thin-film magnetic head 212 is energized in a state where it faces the magnetic disk 201, the thin-film magnetic head 212 performs the recording processing or the reproducing processing to the magnetic disk 201, based on the above-described operational principle.

The magnetic recording device is mounted with the above-described thin-film magnetic head, so that it is possible to improve the recording performance.

Example

Next, a specific example according to the present invention will be described in detail.

Figure 30:
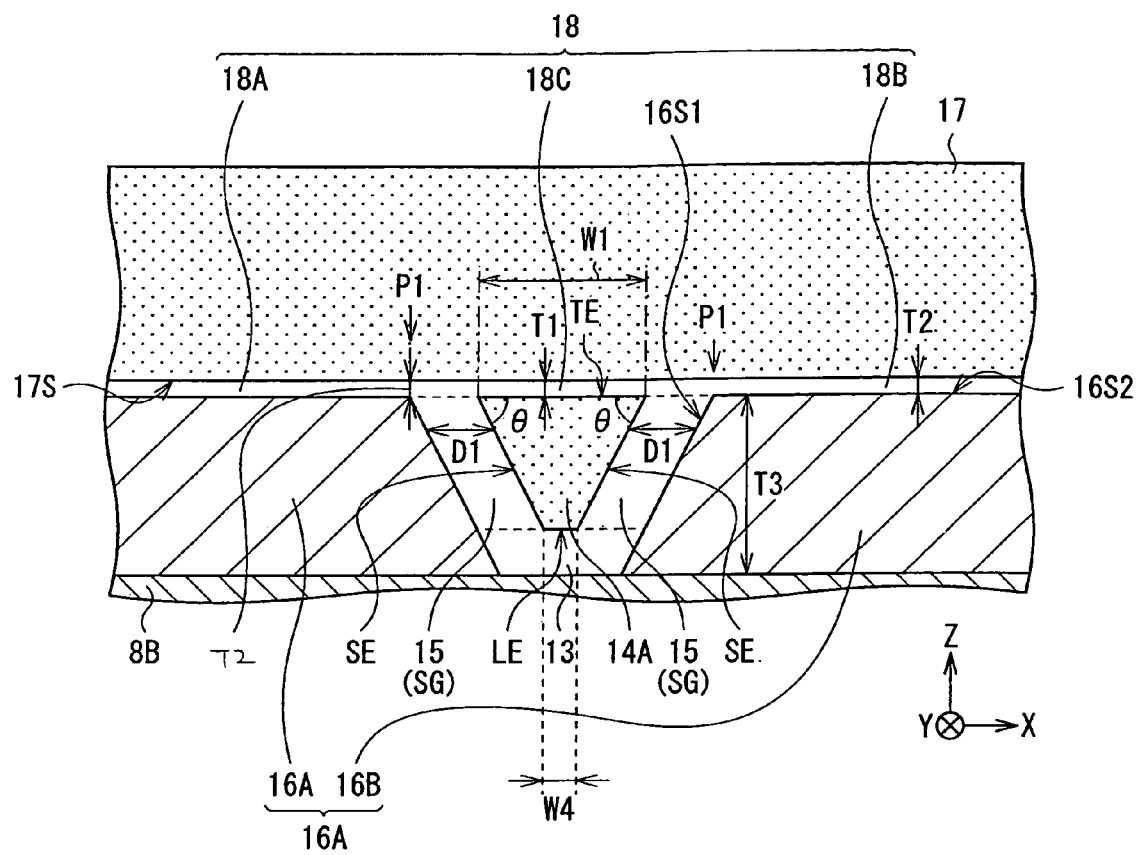
FIG. 30 is a cross-sectional view illustrating the configuration of a thin-film magnetic head provided with a perpendicular magnetic recording head serving as a comparative example.

The recording performance was examined for the thin-film magnetic head according to the embodiment, illustrated in FIG. 4 (Example 1); the thin-film magnetic heads according to Modifications 1 to 3, illustrated in FIGS. 23 to 25 (Examples 2 to 4); and the thin-film magnetic head according to the comparative example, illustrated in FIG. 30 (Comparative example 1).

In forming the main part of the thin-film magnetic head according to the embodiment, the tip portion 14A, the leading shield 8B, the trailing shield 17, and the side shields 16A, 16B were formed by growing a plating film of an alloy of iron and cobalt using the electrolytic plating method. At this time, for the tip portion 14A, the thickness was 0.2 µm; the width W1 of the trailing edge TE was 0.09 µm; the width W4 of the leading edge LE was 0.15 µm; and the bevel angle θ was 14 degrees. Alumina was deposited using the sputtering method, whereby the insulating layer 13, the side gap 15, and the trailing gap 18 were formed, respectively. Here, the gap length D1 was 0.10 µm, and the thickness T1 of the central portion 18C in the trailing gap 18 was 0.03 µm. The thickness T2 of the wing portions 18A, 18B in the trailing gap 18 was 0.03 μm at the position P1, same as the thickness T1, and was 0.05 μm at the maximum. The thickness T3 of the side shields 16A, 16B was 0.30 μm at the position P1, and was 0.22 μm at the minimum. The thickness of the insulating layer 13 was 0.08 μm.

In the case of forming the main part of the thin-magnetic film according to the comparative example, the procedures similar to those in the embodiment were taken except that the thickness of the trailing gap 18 was uniform (0.03 μm).

For each of the examples and the comparative example, examined were a perpendicular-component magnetic field, the gradient of the perpendicular-component magnetic field, the effective magnetic field which exercises an effect on a track adjacent to the track to be written (the most adjacent track) (ATE (adjacent track erase) effective magnetic field), a perpendicular component of the ATE effective magnetic field, and the WATE effective magnetic field while flowing a predetermined recording current (here, of 40 mA) in the thin-film coils 10, 22, and obtained were the results indicated in Table 1 (each of the items was normalized considering a value of the comparative example as 100%). Among the items indicated in Table 1, as to the perpendicular-component magnetic field and the gradient of the perpendicular-component magnetic field, it is preferable to have a higher value. Meanwhile, as to the ATE effective magnetic field, the perpendicular component of the ATE effective magnetic field, and the WATE effective magnetic field, it is preferable to have a lower value. Here, the ATE effective magnetic field is the resultant obtained through the detection of the magnetic field magnitude (sum of components in all directions) at a position away only by 0.1 μm in the write-track width direction from a central position of the track to be written. The WATE effective magnetic field is the resultant obtained through the calculation of a maximum value of the magnetic field magnitude (sum of components in all directions) in a range of 0.2 μm to 0.5 μm in the write-track width direction from the central position of the track to be written.

TABLE 1

| | Perpendicular-component magnetic field (%) | Gradient of Perpendicular-component magnetic field (%) | ATE effective magnetic field (%) | Perpendicular component of ATE effective magnetic field (%) | WATE effective magnetic field (%) |
|---|---|---|---|---|---|
| Comparative example 1 | 100.00 | 100.00 | 100.00 | 100.00 | 100.00 |
| Example 1 | 100.00 | 100.00 | 100.00 | 100.00 | 95.31 |
| Example 2 | 100.40 | 97.96 | 100.11 | 102.13 | 91.10 |
| Example 3 | 100.45 | 91.93 | 100.21 | 101.15 | 90.32 |
| Example 4 | 100.62 | 91.52 | 100.21 | 100.64 | 89.54 |

As indicated in Table 1, in Examples 1 to 4, it was possible to ensure the perpendicular-component magnetic field and the gradient of the perpendicular-component magnetic field comparable with those in Comparative example 1, and to significantly improve the WATE effective magnetic field. Especially, in Examples 2 to 4, it was possible to further improve the WATE effective magnetic field.

Hereinbefore, although the present invention is described with the embodiment, the present invention is not limited to the above-described embodiment, and various modifications may be made. For example, although the case is explained where the perpendicular magnetic recording head according to the present invention is applied to the composite head, it is not always limited thereto. The perpendicular magnetic recording head according to the present invention may be applied to a recording-dedicated head not equipped with a reproducing head portion.

Figure 28:
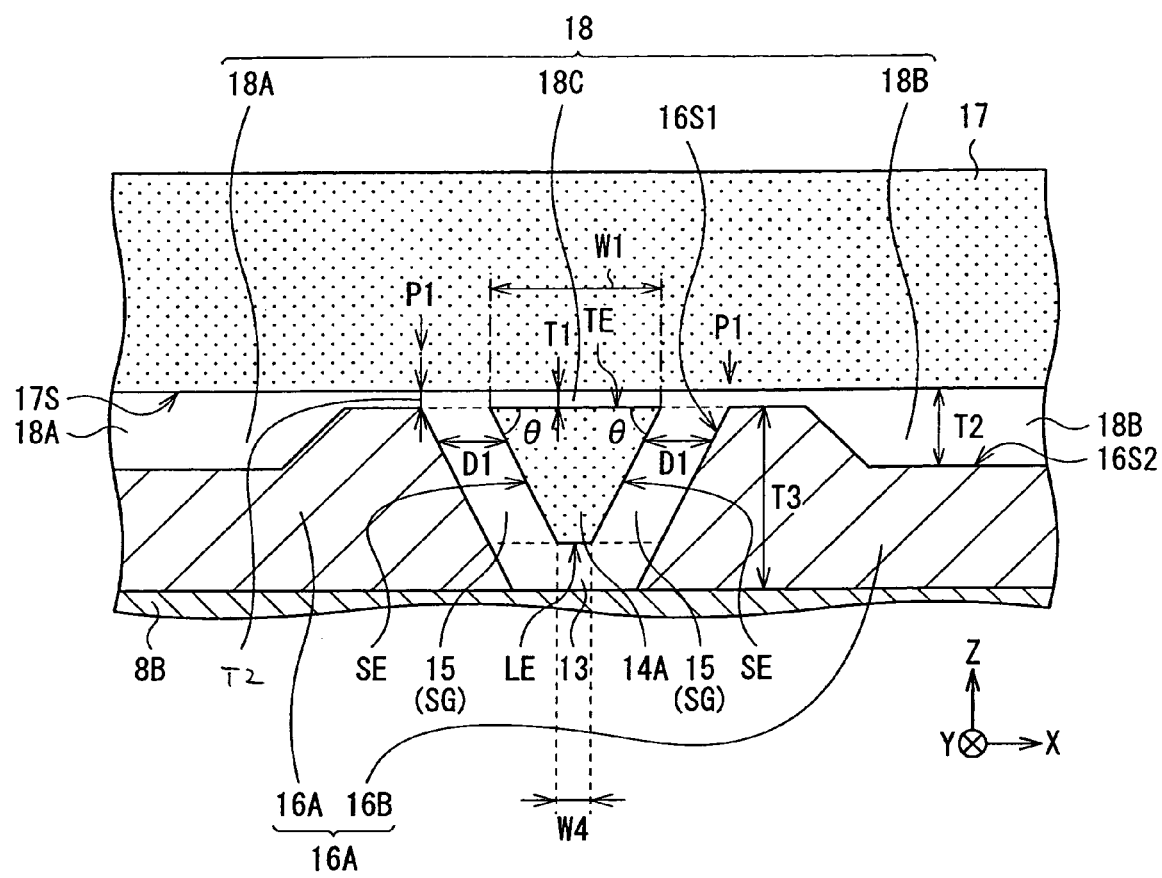
FIG. 28 is a cross-sectional view for explaining a forth modification with respect to the configuration of the thin-film magnetic head.
Figure 29:
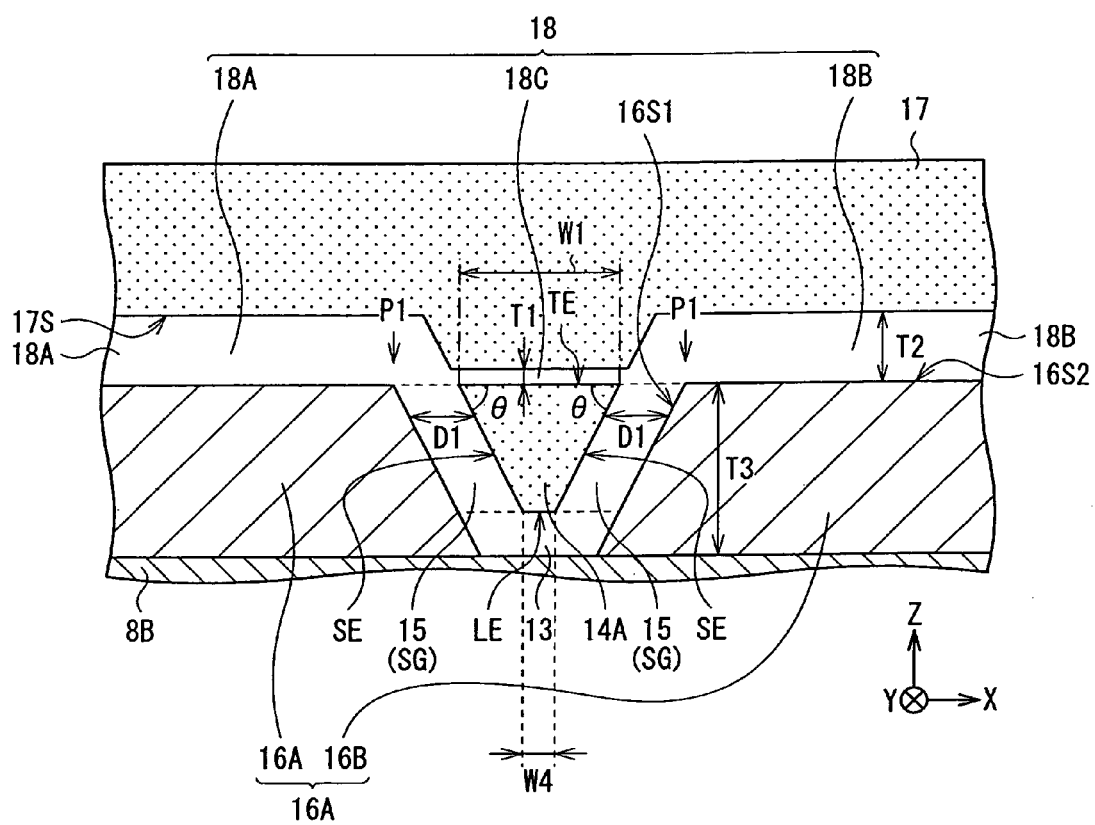
FIG. 29 is a cross-sectional view for explaining a fifth modification with respect to the configuration of the thin-film magnetic head.

Various modifications may be made also to the configuration (shape) of the main part in the thin-film magnetic head. For example, the main part of the thin-film magnetic head may be configured as illustrated in FIGS. 28, 29. The thin-film magnetic head in FIG. 28 is configured such that the side shields 16A, 16B include a portion having the predetermined thickness in the vicinity of the tip portion 14A (Modification 4). In FIG. 29, the trailing shield 17 is configured so as to protrude only a portion corresponding to the tip portion 14A, while the thickness T3 of the side shields 16A, 16B is uniform (Modification 5). In the respective modifications, the thickness T2 of the wing portions 18A, 18B is larger than the thickness T1 of the central portion 18C at a position away from the tip portion 14A.

The correspondence relation between reference numerals and the components of the embodiment will be described as follows.

1 . . . substrate
2, 9, 11 to 13, 20, 21, and 23 . . . insulating layer
3 . . . bottom lead shield
4 . . . shielding gap
5 . . . top lead shield
6 . . . magnetoresistive effect (MR) element
7 . . . separating layer
8A and 8C . . . magnetic layer
8B . . . leading shield
10 and 22 . . . thin-film coil
14 . . . main magnetic-pole layer
14A . . . tip portion
14B . . . rear end portion
15 . . . side gap (SG)
16A and 16B . . . side shield
17 . . . trailing shield
18 . . . trailing gap
18A and 18B . . . wing portion
18C . . . central portion
19 . . . auxiliary magnetic-pole layer
24 . . . return yoke layer
25 . . . overcoat layer
30 . . . air bearing surface
40 . . . recording medium
100A . . . reproducing head portion
100B . . . recording head portion
200 . . . housing
201 . . . magnetic disk
202 . . . magnetic head slider
203 . . . suspension
204 . . . arm
205 . . . spindle motor
206 . . . drive section
207 . . . fixed shaft
208 . . . bearing
211 . . . substrate
212 . . . thin-film magnetic head
220 . . . air bearing surface

What is claimed is:

1. A perpendicular magnetic write head comprising:
a magnetic pole having an end face exposed on an air bearing surface;
a pair of side shields each having an end face exposed on the air bearing surface, the pair of side shields being arranged on both sides of the magnetic pole with side gaps in between, respectively, the both sides being in a write-track width direction; and a trailing shield provided on a trailing side of the magnetic pole and of the pair of side shields with a trailing gap in between, and having an end face exposed on the air bearing surface, wherein the trailing gap has a first regional part and a second regional part, the first regional part separating a trailing edge of the magnetic pole from the trailing shield, and the second regional part separating the pair of side shields from the trailing shield, an overall or a part of the second regional part has a thickness larger than a thickness of the first regional part, the second regional part has a minimum thickness at a first position which is closest to the magnetic pole, and the second regional part includes a part where thickness increases with increasing distance starting at the first position from the magnetic pole in the write-track width direction.

2. The perpendicular magnetic write head according to claim 1, wherein each of the pair of side shields has a maximum thickness at a first position which is closest to the magnetic pole.

3. The perpendicular magnetic write head according to claim 2, wherein each of the pair of side shields includes a part where thickness decreases with increasing distance starting at the first position from the magnetic pole in the write-track width direction.

4. The perpendicular magnetic write head according to claim 1, wherein the thickness of the first regional part is uniform in the write-track width direction.

5. The perpendicular magnetic write head according to claim 1, wherein a surface which faces the magnetic pole, of the trailing shield, is planar.

6. The perpendicular magnetic write head according to claim 1, wherein the trailing shield is coupled to the magnetic pole with a return yoke layer in between at a position away from the air bearing surface, and a first coil is provided so as to penetrate a space surrounded with the trailing shield, the return yoke layer, and the magnetic pole.

7. The perpendicular magnetic write head according to claim 1, further comprising a leading shield provided on a leading side of the magnetic pole with a leading gap in between, and having an end face exposed on the air bearing surface.

8. The perpendicular magnetic write head according to claim 7, wherein the leading shield is connected to the pair of side shields.

9. The perpendicular magnetic write head according to claim 8, further comprising:

a first magnetic layer extending in a direction away from the air bearing surface while insulated from the leading shield, and a coil provided so as to penetrate a space surrounded with the leading shield, the first magnetic layer, and the magnetic pole.

10. The perpendicular magnetic write head according to claim 7, wherein the leading shield is coupled to the magnetic pole, via one or more other magnetic layers, at a position away from the air bearing surface, and a coil is provided so as to penetrate a space surrounded with the leading shield, the other magnetic layers, and the magnetic pole.

11. The perpendicular magnetic write head according to claim 7, wherein the leading shield is coupled to a first magnetic layer extending in the direction away from the air bearing surface, and a coil is further provided so as to penetrate the space surrounded with the leading shield, the first magnetic layer, and the magnetic pole.

12. The perpendicular magnetic write head according to claim 11, further comprising a second magnetic layer configured to have a bottom face coupled to the first magnetic layer at a position away from the bearing surface, and to have a top face approaching toward the magnetic pole in a thickness direction, and the coil penetrates a space surrounded with the leading shield, the first magnetic layer, the second magnetic layer, and the magnetic pole.

13. A magnetic recording device comprising a recording medium and a perpendicular magnetic write head, the perpendicular magnetic write head including:

a magnetic pole having an end face exposed on an air bearing surface;

a pair of side shields each having an end face exposed on the air bearing surface, the pair of side shields being arranged on both sides of the magnetic pole with side gaps in between, respectively, the both sides being in a write-track width direction; and a trailing shield provided on a trailing side of the magnetic pole and of the pair of side shields with a trailing gap in between, and having an end face exposed on the air bearing surface, wherein the trailing gap has a first regional part and a second regional part, the first regional part separating a trailing edge of the magnetic pole from the trailing shield, and the second regional part separating the pair of side shields from the trailing shield, an overall or a part of the second regional part has a thickness larger than a thickness of the first regional part, the second regional part has a minimum thickness at a first position which is closest to the magnetic pole, and the second regional part includes a part where thickness increases with increasing distance starting at the first position from the magnetic pole in the write-track width direction.

14. A perpendicular magnetic write head comprising:

a magnetic pole having an end face exposed on an air bearing surface;

a pair of side shields each having an end face exposed on the air bearing surface, the pair of side shields being arranged on both sides of the magnetic pole with side gaps in between, respectively, the both sides being in a write-track width direction; and a trailing shield provided on a trailing side of the magnetic pole and of the pair of side shields with a trailing gap in between, and having an end face exposed on the air bearing surface, wherein the trailing gap has a first regional part and a second regional part, the first regional part separating a trailing edge of the magnetic pole from the trailing shield, and the second regional part separating the pair of side shields from the trailing shield, an overall or a part of the second regional part has a thickness larger than a thickness of the first regional part, each of the pair of side shields has a maximum thickness at a first position which is closest to the magnetic pole, and each of the pair of side shields includes a part where thickness decreases with increasing distance starting at the first position from the magnetic pole in the write-track width direction.

* * * * *